US007602398B2

(12) United States Patent
Zhou et al.

(10) Patent No.: US 7,602,398 B2
(45) Date of Patent: Oct. 13, 2009

(54) DECORATING SURFACES WITH TEXTURES

(75) Inventors: Kun Zhou, Beijing (CN); Baining Guo, Beijing (CN); Heung-Yeung Shum, Bellevue, WA (US); Lifeng Wang, Beijing (CN); Yasuyuki Matsushita, Beijing (CN)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 11/045,868

(22) Filed: Jan. 28, 2005

(65) Prior Publication Data

US 2006/0170695 A1    Aug. 3, 2006

(51) Int. Cl.
*G09G 5/00*    (2006.01)
(52) U.S. Cl. ...................................... 345/582
(58) Field of Classification Search .................. 345/582
See application file for complete search history.

(56) References Cited

U.S. PATENT DOCUMENTS

| 6,256,038 B1* | 7/2001 | Krishnamurthy | 345/419 |
| 6,271,856 B1* | 8/2001 | Krishnamurthy | 345/581 |
| 2003/0164838 A1* | 9/2003 | Guo et al. | 345/582 |
| 2004/0041816 A1* | 3/2004 | Yamauchi | 345/582 |
| 2006/0017739 A1* | 1/2006 | Fang et al. | 345/582 |

OTHER PUBLICATIONS

Krishnamurthy, V., et al., "Fitting Smooth Surfaces to Dense Polygon Meshes", Computer Graphics Proceedings, Annual Conference Series, pp. 313-324, 1996.*

Boykov et al., "Fast Approximate Energy Minimization via Graph Cuts," IEEE Transactions on PAMI, vol. 23, No. 11, pp. 1222-1239, Nov. 2001.*

Kwatra, V., et al., "Graphcut Textures: Image and Video Synthesis Using Graph Cuts", ACM Transactions on Graphics, vol. 22, No. 3, pp. 277-286, Jul. 2003.*

Sander et al., "Multi-Chart Geometry Images," Symposium on Geometry Processing 2003, pp. 146-155, 2003.*

Boykov, et al., "Fast Approximate Energy Minimization via Graph Cuts", IEEE Transactions on PAMI, vol. 23, No. 11, Nov. 2001, pp. 1222-1239.

Kwatra, et al., "Graphcut Textures: Image and Video Synthesis Using Graph Cuts", ACM Transactions on Graphics, vol. 22, No. 3, Jul. 2003, pp. 277-286.

(Continued)

*Primary Examiner*—Kee M Tung
*Assistant Examiner*—Jacinta Crawford
(74) *Attorney, Agent, or Firm*—Lee & Hayes, PLLC

(57) ABSTRACT

Surfaces can be decorated with texture tiling and/or texture painting using one or more sample textures, such as BTFs. In a described implementation of texture tiling, a patch-based BTF synthesis algorithm is utilized. In an example embodiment, a mesh of a target surface is re-sampled to produce a dense mesh such that there is a one-to-one correspondence between vertices of the dense mesh and pixels of an image. Patch matching is then employed with a working image that corresponds to a working patch. In an example embodiment, the patch matching is effectuated using translations and rotations of the sample texture. In a described implementation of texture painting, irregular feature(s) of a sample texture are synthesized onto a target surface. In an example embodiment, user-specified constraints as to a desired foreground feature of a sample texture and an intended foreground region of a targeted surface are factored into a graphcut operation.

13 Claims, 16 Drawing Sheets

OTHER PUBLICATIONS

Levy, et al., "Least Squares Conformal Maps for Automatic Texture Atlas Generation", Proceedings of SIGGRAPH 2002, pp. 362-371.

Sander, et al., "Multi-chart Geometry Images", Symposium on Geometry Processing 2003, pp. 146-155.

Zhou, et al., "Iso-charts: Stretch-driven Mesh Parameterization Using Spectral Analysis", Symposium on Geometry Processing 2004, pp. 47-56.

* cited by examiner

TILING OF REGULAR TEXTURE

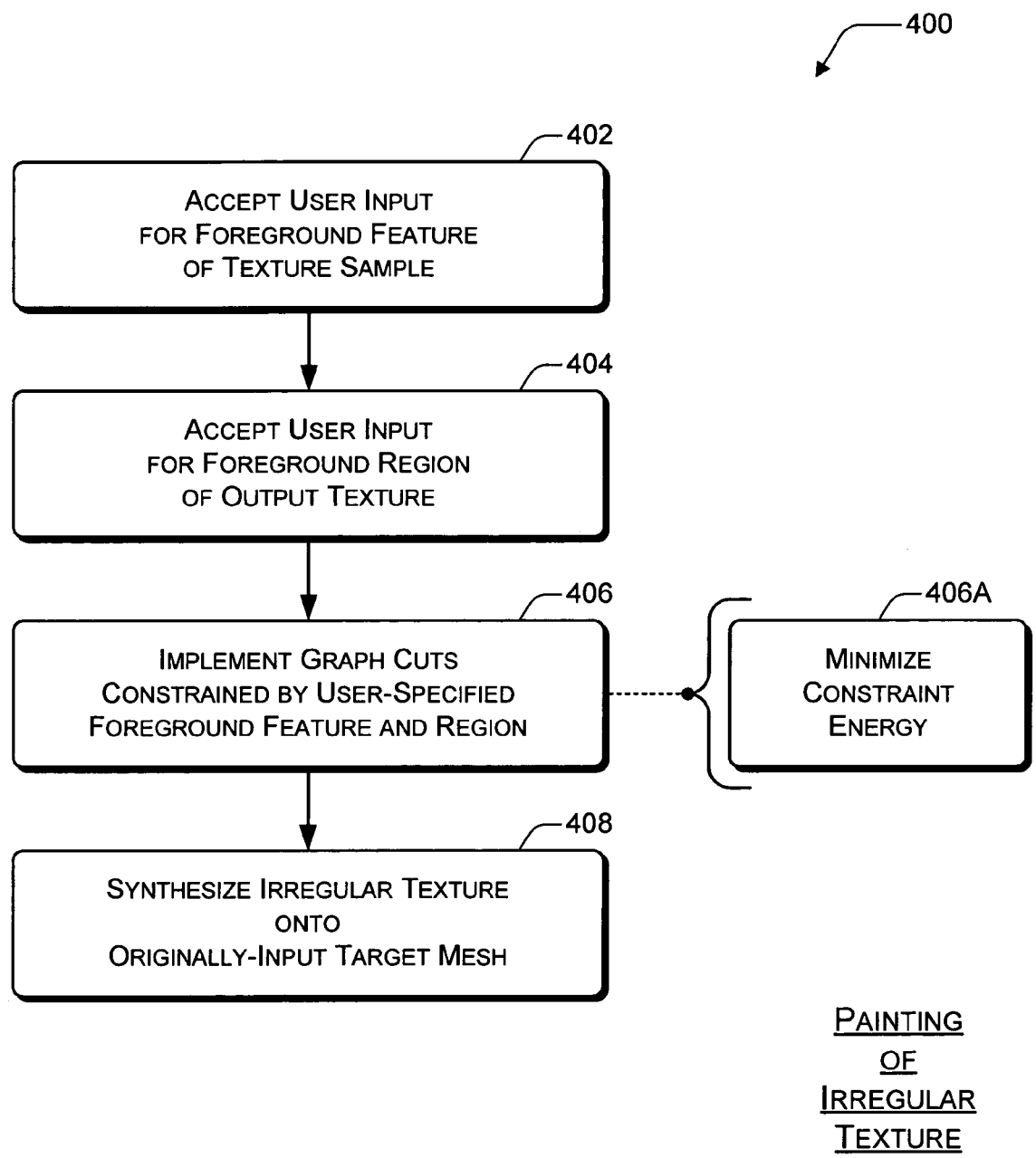

ORIGINAL INPUT MESH

INPUT TEXTURE SAMPLE

TEXTURE SYNTHESIS RESULTS
ON ORIGINAL INPUT MESH
(EXHIBITS VISIBLE SEAMS)

TEXTURE SYNTHESIS RESULTS
ON DENSE SURFACE MESH

TEXTURE
ATLAS

TEXTURE
ATLAS
PARTITIONS

MESH
VERTEX

EQUIVALENT
TO

GRID
POINT

CHARTS

INITIAL
WORK
PATCH (a) (b) (c) (d)

INPUT TEXTURE SAMPLE

SPECIFIED FOREGROUND FEATURE

DECORATING SURFACES WITH TEXTURES

TECHNICAL FIELD

This disclosure relates in general to decorating surfaces with textures such as bidirectional texture functions (BTFs) and in particular, by way of example but not limitation, to (i) tiling regular BTF samples onto a target surface and/or (ii) painting irregular BTF samples onto a e.g. tiled surface.

BACKGROUND

Texture mapping was introduced about three decades ago as a way to add surface detail without adding geometry. Texture-mapped polygons have since become the basic primitives of the standard graphics pipeline. Unfortunately, texture-mapped surfaces have a distinctive look that sets them apart from reality. For example, they cannot accurately respond to changes in illumination and viewpoint.

Real-world surfaces are usually not smooth; instead, they are covered with textures that arise from both spatially-variant reflectance and fine-scale geometry details that are often termed "mesostructures". Real surfaces also exhibit imperfections (e.g., dirt, cracks, and scratches) that typically result from relatively complicated physical processes. Even three decades later, capturing these surface characteristics is a challenging goal for computer graphics.

Accordingly, there is a need for schemes, mechanisms, techniques, etc. that can efficiently and/or conveniently enable computer graphics to better capture spatially-variant reflectance and/or fine-scale geometric mesostructures.

SUMMARY

Surfaces can be decorated with one or more sample textures, such as bidirectional texture functions (BTFs). The decorating can involve texture tiling and/or texture painting. In a described implementation of texture tiling, a patch-based BTF synthesis algorithm is utilized. In an example embodiment, a mesh of a target surface is re-sampled to produce a dense mesh such that there is a one-to-one correspondence between vertices of the dense mesh and pixels of an image. A working patch is found. Patch matching is then employed with a working image that corresponds to the working patch. In an example embodiment, the patch matching is effectuated using both translations and rotations of the sample texture. Patch fitting is then effectuated with the corresponding working patch. In a described implementation of texture painting, irregular feature(s) of a sample texture are synthesized onto a target surface. In an example embodiment, user-specified constraints as to the desired foreground feature of a sample texture and the intended foreground region of a targeted surface are factored into a graphcut operation. For instance, defined constraint energy may be minimized as part of the graphcut operation.

Other method, system, approach, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIG. 4 is a flow diagram that illustrates an example of a method for painting a surface with an irregular texture sample.

DETAILED DESCRIPTION

Introduction

Schemes, mechanisms, techniques, etc. for decorating arbitrary surfaces with bidirectional texture functions (BTFs) are described herein. In a described implementation, BTF-decorated surfaces are generated in two steps. First, a BTF is automatically tiled or synthesized over a target surface from a given BTF sample. Second, the user is enabled to interactively paint BTF patches onto the tiled surface, such that the painted patches seamlessly integrate with the background patterns.

In a described implementation, a patch-based texture synthesis approach known as quilting is employed. More specifically, a graphcut algorithm for BTF tiling or synthesis on surfaces is employed. The described graphcut algorithm works well for a wide variety of BTF samples, including at least some of those that present problems for existing algorithms. In another described implementation, a graphcut texture painting algorithm for creating new surface irregularities such as imperfections (e.g., dirt, cracks, scratches, etc.) from existing irregularities found in input BTF samples is employed.

Using the algorithms described herein, surfaces can be decorated with real-world textures that have spatially-variant reflectance, fine-scale geometry details, and/or surfaces imperfections. For example, BTF tiling enables a BTF to be synthesized onto a target surface of a geometric model, and BTF painting allows imperfections of real materials to be captured and then painted onto geometric models, including those models that have already been tiled.

In the following section, decorating surfaces with texture samples is described qualitatively with reference to FIGS. 1-4. In the section thereafter, decorating surfaces with texture samples is described quantitatively with particular reference to FIGS. 5A-12.

Qualitative Description of Decorating Surfaces with Texture Samples

Figure 1:
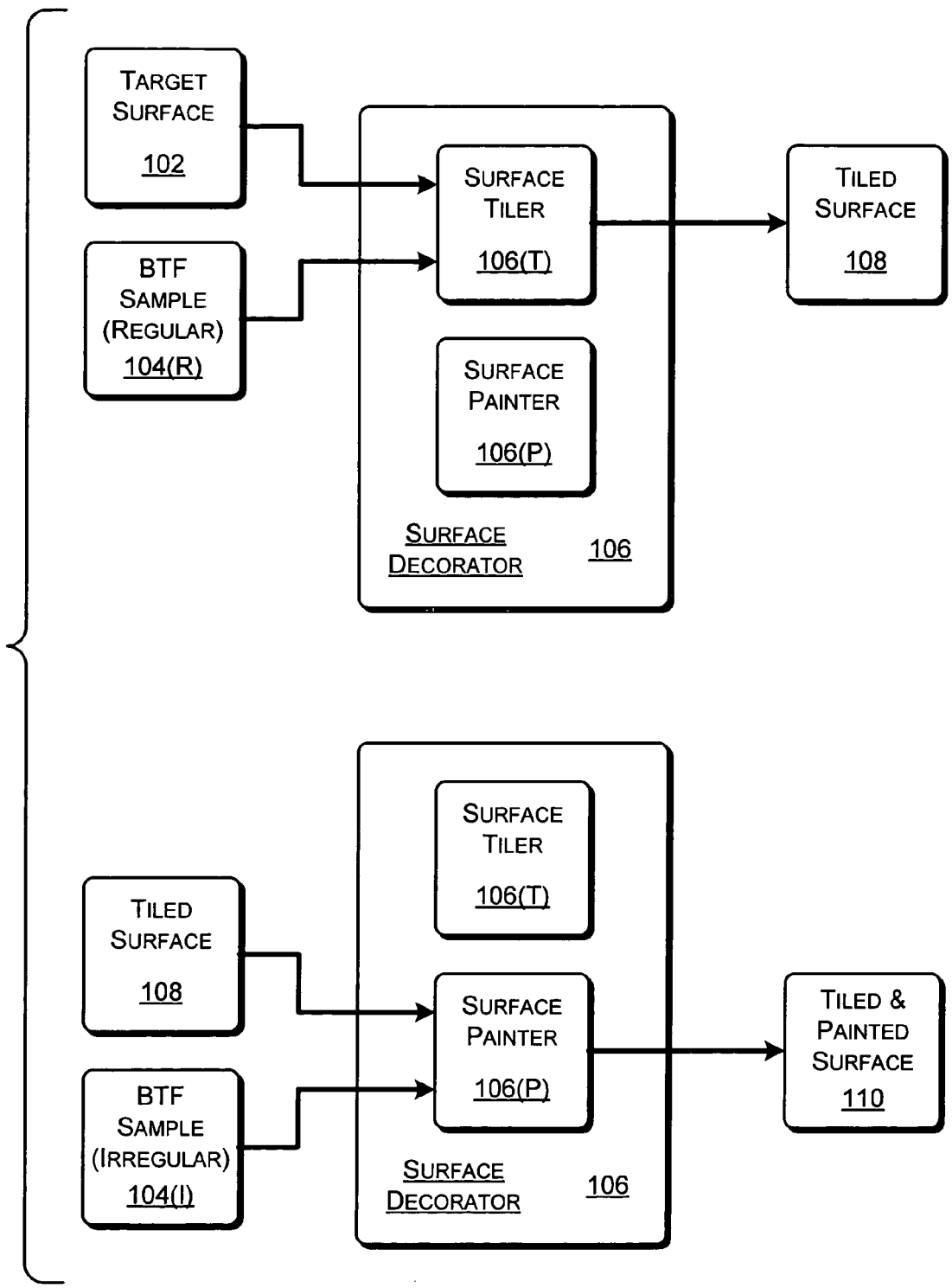
FIG. 1 is a block diagram illustration of an example surface decorator that is capable of surface tiling and/or surface painting.

FIG. 1 is a block diagram illustration of an example surface decorator 106 that is capable of surface tiling 106(T) and/or surface painting 106(P). As illustrated, surface decorator 106 includes a surface tiler 106(T) and a surface painter 106(P). Surface decorator 106, surface tiler 106(T), and surface painter 106(P) may be realized individually or jointly using hardware, software, firmware, some combination thereof, and so forth. For example, they may be realized as modules of a software program. Alternatively, all or part of their functionality may be realized as a hard-coded semiconductor or chipset.

In a described implementation, surface tiler 106(T) is capable of applying a surface texture to all or a part of a target surface 102. Surface tiler 106(T) synthesizes a relatively homogenous texture that can still maintain spatially-variant reflectance, mesostructures, and so forth. Surface painter 106 (P) is capable of applying specially-identified irregular features to a target surface 102. Surface painter 106(P), in accordance with user-specified constraints, synthesizes irregular features as a foreground texture such that they are realistically merged with a background texture.

A target surface 102 is obtained, and a selected regular BTF sample 104(R) is applied thereto. Surface tiler 106(T) tiles or synthesizes regular BTF sample 104(R) onto target surface 102 to produce tiled surface 108. Tiled surface 108 can be further enhanced or augmented with irregular BTF sample 104(I), which can be imperfections or other special foreground features. Surface painter 106(P) paints or synthesizes irregular BTF sample 104(I) onto tiled surface 108 to produce tiled and painted surface 110.

Although implementations are primarily described herein with regard to BTF type textures, other textures may alternatively be utilized. Also, a single texture sample 104 may include both regular and irregular aspects.

Figure 2:
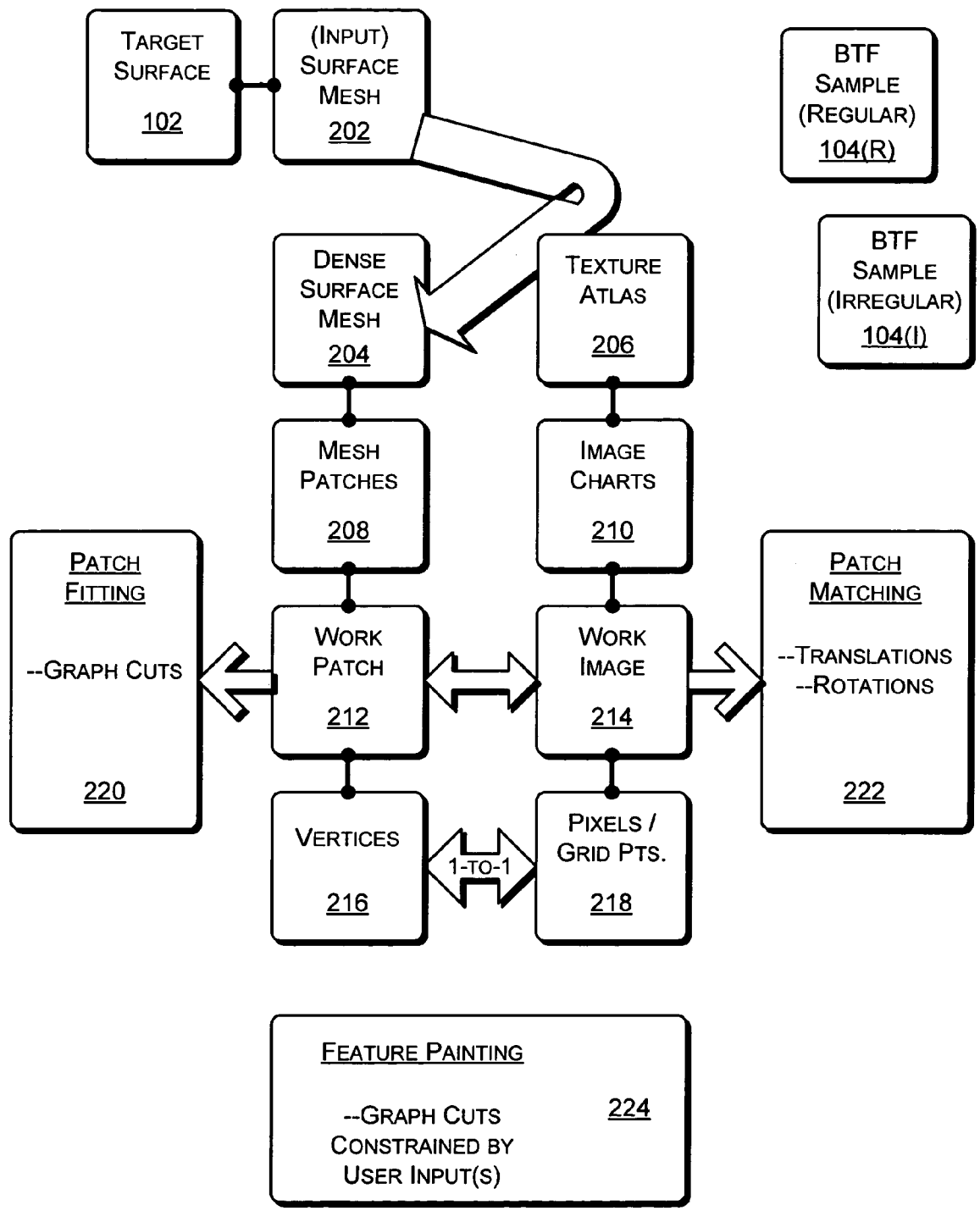
FIG. 2 illustrates example blocks relating to surface tiling with a regular texture sample and surface painting with an irregular texture sample.

FIG. 2 illustrates example blocks relating to surface tiling with a regular texture sample 104(R) and surface painting with an irregular texture sample 104(I). Target surface 102 has an original or input surface mesh 202. In a described implementation, a dense surface mesh 204 is constructed using a texture atlas 206. For example, a multi-chart geometric image mesh (MCGIM) may be used along with texture atlas 206 to resample input surface mesh 202 to produce dense surface mesh 204. The mesh is partitioned into fairly large charts that are parameterized with minimized stretch. Consequently, mesh patches 208 of dense surface mesh 204 may be developed that are analogous to image charts 210 of texture atlas 206.

During surface tiling, work patches 212 from dense surface mesh 204 are identified, with each work patch 212 being associated with a respective work image 214 or portion thereof from image charts 210. As a result of the re-sampling that constructs dense surface mesh 204, vertices 216 of dense surface mesh 204 correspond to grid points or pixels 218 of image charts 210. More specifically, there is a one-to-one correspondence between each vertex 216 of dense surface mesh 204 and each pixel 218 of image charts 210. It should be understood that image resolution, ratio realities, mathematical remainders, etc. can prevent the creation of a 100% one-to-one correspondence; nevertheless, a substantially one-to-one correspondence can usually be created.

As a consequence of the one-to-one correspondence, some operations can be performed in the image space on image charts 210 with pixels 218 and other operations can be performed in the mesh space on mesh patches 208 with vertices 216. Moreover, results can be moved between the image space and the mesh space.

In a described implementation, for example, patch matching 222 is performed and accomplished in the image space with respect to a work image 214. To account for the three-dimensional (3D) nature of the original input surface mesh 202, patch matching may involve rotations as well as translations. Patch fitting 220, on the other hand, is performed and accomplished in the mesh space with respect to a work patch 212. The patch fitting may be effectuated with a graphcuts operation.

Feature painting 224 is part of surface painter 106(P). Hence, an irregular texture feature is applied to an input surface mesh 202. A graphcuts operation is employed to effectuate the feature painting. However, in a described implementation, the graphcuts operation is constrained by user input(s). For example, a user may specify constraints as to a desired foreground feature of a sample texture 104(I) and an intended foreground region of a targeted surface 102. In an example embodiment, the constraint energy as defined by the user is minimized as part of the graphcut operation.

Figure 3:
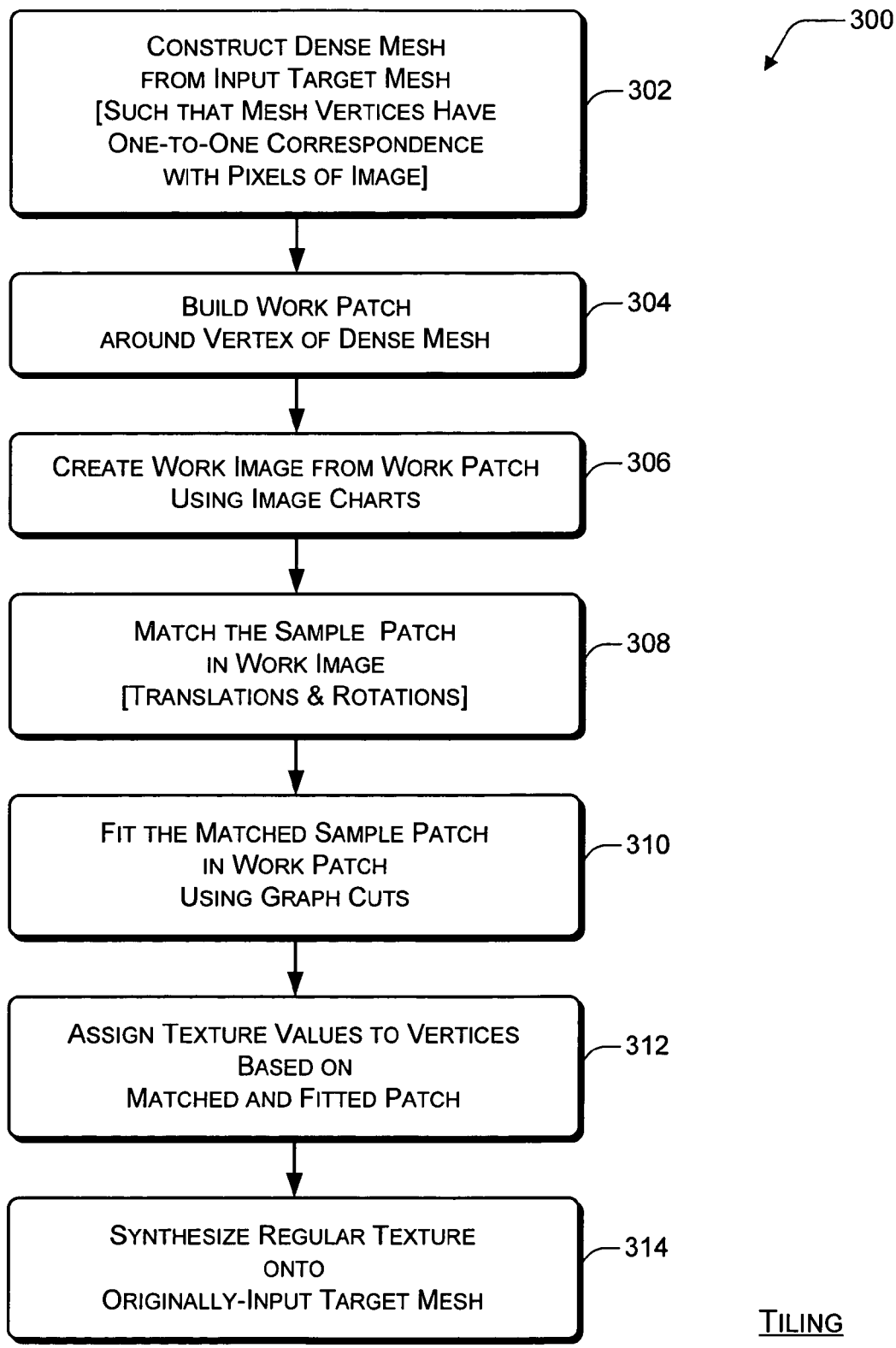
FIG. 3 is a flow diagram that illustrates an example of a method for tiling a surface with a regular texture sample.

FIG. 3 is a flow diagram 300 that illustrates an example of a method for tiling a surface with a regular texture sample. Flow diagram 300 includes seven (7) blocks 302-314. Although the actions of flow diagram 300 may be performed in other environments and with a variety of hardware and software combinations, FIGS. 1-2 are used in particular to illustrate certain aspects and examples of the method. By way of example only, the actions of flow diagram 300 may be performed by a surface tiler 106(T) of a surface decorator 106.

At block 302, a dense mesh is constructed from an input target mesh such that mesh vertices of the dense mesh have a one-to-one correspondence with pixels of an image. For example, dense surface mesh 204 may be constructed from input surface mesh 202 (of a target surface 102) such that vertices 216 have a one-to-one correspondence with pixels 218. This construction may be effectuated using, for instance, a multi-chart geometric image mesh (MCGIM) derived from target surface 102.

At block 304, a work patch is built around a vertex of the dense mesh. For example, a work patch 212 may be built around a most-constrained vertex 216 of vertices 216 of dense surface mesh 204. At block 306, a work image is created from a work patch using image charts. For example, work image 214 may be created from work patch 212 using image charts 210 that are derived responsive to a texture atlas 206.

At block 308, a sample patch is matched to pre-existing pixels in the work image using rotations as well as translations of the sample patch. For example, a regular texture sample 104(R) may be matched 222 to pixels that have already been added to work image 214. The matching investigation may utilize rotations as well as translations to find an acceptable, if not optimum, sample patch position.

At block 310, the matched sample patch is fit into the work patch using a graph cuts algorithm. For example, regular texture sample 104(R) may be fit 220 to work patch 212 using a graphcuts procedure in dependence on a seam cost threshold and responsive to the position located during the patch matching (of block 308).

At block 312, texture values are assigned to vertices based on the matched and fitted patches. For example, texture values from regular texture sample 104(R) may be assigned to vertices 216 of dense surface mesh 204 in accordance with the results of patch matching 222 and patch fitting 220. At block 314, the regular texture sample is synthesized onto the originally-input target mesh. For example, regular texture sample 104(R) is therefore synthesized onto input surface mesh 202 of target surface 102.

FIG. 4 is a flow diagram 400 that illustrates an example of a method for painting a surface with an irregular texture sample in accordance with a user-specified constraint function for graphcuts. Flow diagram 400 includes four (4) blocks 402-408. Although the actions of flow diagram 400 may be performed in other environments and with a variety of hardware and software combinations, FIGS. 1-2 are used in particular to illustrate certain aspects and examples of the method. By way of example only, the actions of flow diagram 400 may be performed by a surface painter 106(P) of a surface decorator 106.

At block 402, user input is accepted as demarcating a foreground feature of a texture sample. For example, an imperfection may be demarcated by a user as a foreground feature in an irregular texture sample 104(I). At block 404, user input is accepted as delineating a foreground region of an output texture. For example, a region that is to receive the irregular feature of irregular texture sample 104(I) may be delineated by a user as a foreground region of the ultimate output texture on target surface 102. The input foreground feature and foreground region are user constraints for the irregular feature painting process 224.

At block 406, graphcuts are implemented as constrained by the user-specified foreground feature and region. For example, a graphcuts operation is effectuated responsive to the demarcated irregular feature of irregular texture sample 104(I) and the delineated foreground region of the ultimate output texture on target surface 102.

In a described implementation and as indicated by block 406A, this graphcuts operation is further effectuated by minimizing the constraint energy. The constraint energy measures how well the synthesized texture satisfies the user-specified constraint. Moreover, both the smoothness energy and the constraint energy may be minimized during the graphcuts operation. These energies and a graphcuts operation for irregular texture painting are described further herein below with particular reference to FIGS. 10 and 11.

At block 408, the irregular texture sample is synthesized onto the originally-input target mesh. For example, irregular texture sample 104(I) is therefore synthesized onto input surface mesh 202 of target surface 102. For improved blending and aesthetic appearance, input surface mesh 202 in this context can comprise a tiled surface 108.

Quantitative Description of Decorating Surfaces with Texture Samples

Foundation

With respect to texture synthesis, algorithms for synthesizing textures on surfaces can be divided into two categories. A first category is based on per-pixel non-parametric sampling. However, per-pixel sampling is susceptible to the problems caused by the fact that the commonly-used L2-norm is actually a poor measure of perceptual similarity. Consequently, algorithms in this first category have difficulty maintaining texture patterns with certain types for textures. Although there have been remedies proposed for various specific scenarios, there is no prior general solution.

Algorithms in a second category synthesize textures by copying patches of the input texture sample. Because texture patterns are directly copied onto the target surface, these second category algorithms are not seriously affected by the problems related to the L2-norm. Earlier second category algorithms randomly paste patches and use alpha-blending to hide patch seams. Quilting, however, generates significantly better results by carefully placing patches to minimize the discontinuity across patch seams. After placing patches, in addition to using alpha-blending to hide patch seams, it is possible to further enhance the smoothness across the seams by searching for the "min-cut" seams. It has been shown that, for image textures, quilting with graph cuts produces arguably the best visible results on the largest variety of textures. Implementations disclosed herein describe how to perform graph cuts on surfaces.

With respect to decorating surfaces with imperfections, it has been proposed to use a set of texturing operations that include tiling and positioning of small images onto surfaces. Existing techniques generally focus on generating synthetic surface imperfections. Implementations disclosed herein describe how to synthesize imperfections from real-world as well as synthetic samples.

Introduction

Figure 5A:
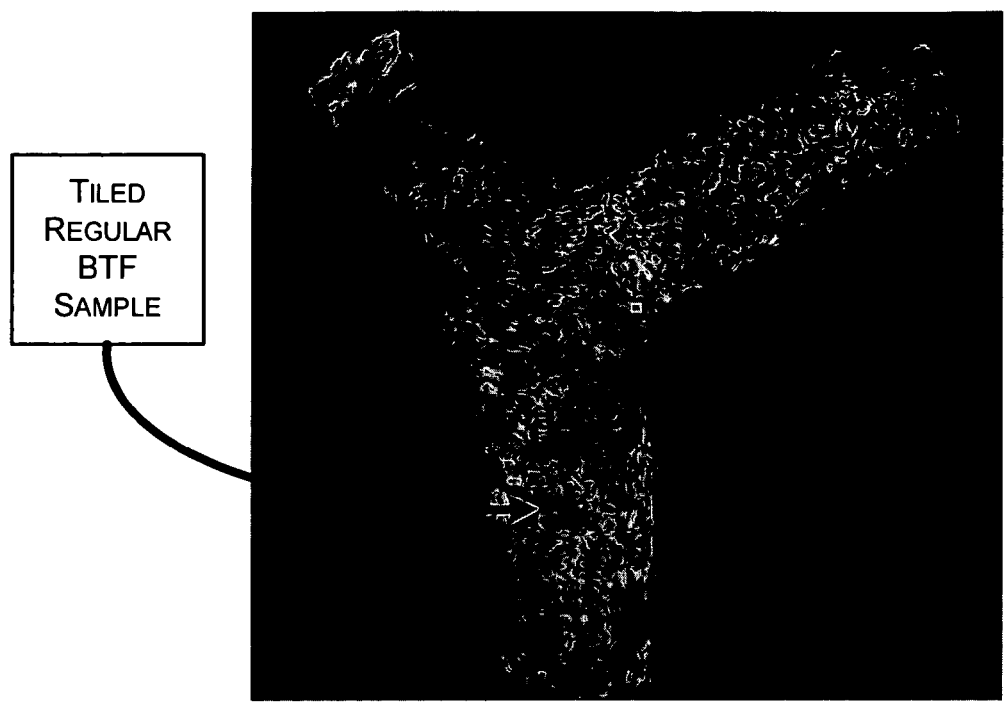
FIG. 5A illustrates an example of a surface that has been tiled with a relatively realistic texture.
Figure 5B:
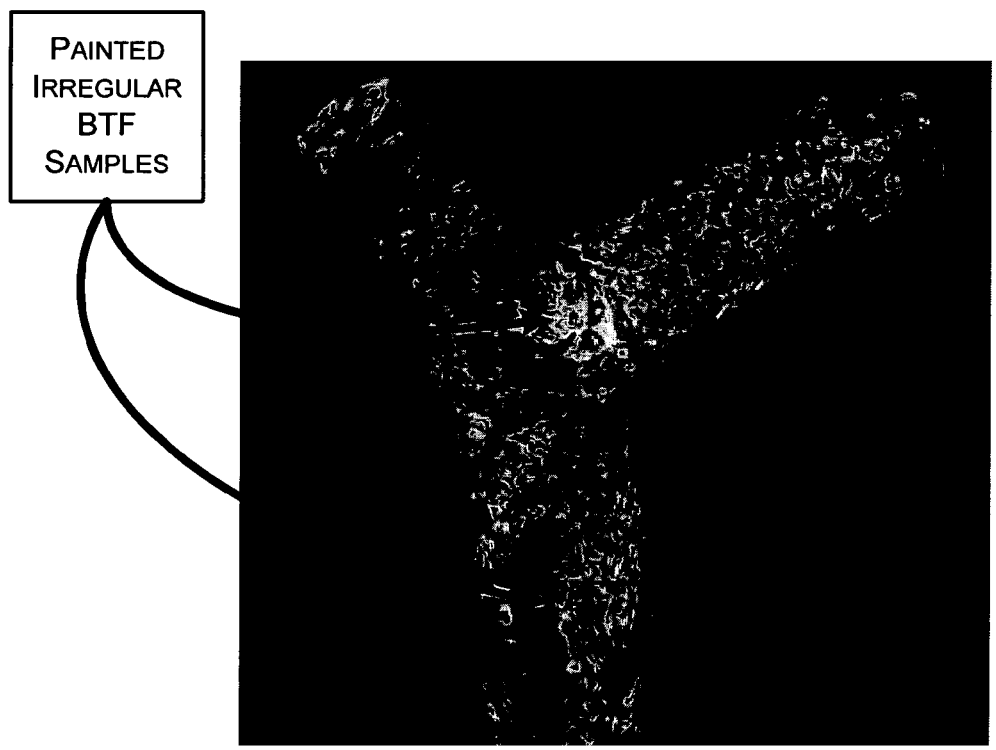
FIG. 5B illustrates an example of the tiled surface of FIG. 5A after being augmented with an irregular feature.

Described herein are schemes, mechanisms, techniques, etc. that enable the decoration of arbitrary surfaces with BTFs. Two relatively high-level texturing operations are supported: tiling and painting. Given a BTF sample, the tiling operation can automatically synthesize a BTF that fits the target surface naturally and seamlessly. The BTF can model spatially-variant reflectance and mesostructures. Moreover, the BTF can be derived (e.g., measured) from real materials. Hence, the tiling operation provides a convenient way to cover a surface with fairly realistic textures. FIG. 5A shows an example of a surface that has been tiled with a relatively realistic texture. The painting operation further enhances realism by introducing irregular features and other imperfections. FIG. 5B shows an example of the tiled surface of FIG. 5A after being augmented with an irregular feature. In other words, the painting operation has introduced surface imperfections into the homogeneous BTF.

The painting operation is valuable because BTFs generated by described synthesis algorithm(s), as well as by other synthesis algorithms, are typically homogeneous across the whole decorated surface. With the painting operation, the global homogeneity can be broken by adding irregular local features. In particular, imperfections of real materials can be captured and then painted onto the surface such that the painted imperfections fit in seamlessly with the (e.g., tiled) background patterns.

Three-dimensional (3D) painting in general is a well-established technique for creating patterns on surfaces. BTF painting extends traditional techniques in two ways. First, it provides a way to achieve superior realism by applying BTFs that are measured from real materials. Second, BTF painting reduces the demand on artistic talents and the tedium that is needed for creating realistic imperfections.

Two primary challenges were addressed in the development of the described system. First, BTF synthesis on surfaces remains difficult for many BTF samples. Typically, the most difficult problem is maintaining the mesostructures of the input BTF sample. An existing algorithm addresses this problem with partial success by synthesizing the BTF pixelby-pixel. However, synthesizing a BTF pixel-by-pixel leads to fundamental problems in maintaining mesostructures because L2-norm is a poor measure of perceptual similarity.

An alternative is to synthesize BTFs by copying patches of the input sample (i.e., to employ quilting). Because mesostructures are copied along with the patches, this approach is particularly effective for maintaining mesostructures. Unfortunately, patch seams still present a problem for BTFs being applied with patches. Although techniques exist for hiding seams in surface textures, these techniques do not generalize well to the mesostructure-containing BTFs. For example, blending can be used to hide patch seams, but such blending creates inconsistent mesostructures in the blended areas.

Described herein are algorithm(s) for quilting BTF patches by using graphcuts to minimize the discontinuity across patch seams on arbitrary surface meshes. A straightforward extension and application of graphcuts to hierarchical pattern mapping can be used to generate texture coordinates for each triangle of an arbitrary surface mesh. However, such an approach leads to textures that reveal patch seams, at least when viewed close up. This is a potential problem for any attempt to apply graphcuts to surface meshes.

In described implementation(s), this problem is addressed by densely re-sampling the surfaces using geometry images. This approach is termed "GIM-based sampling" herein. Specifically, given an input mesh, a dense mesh is created by densely sampling the input mesh using multi-chart geometric images (MCGIM). The texture synthesis is accomplished by using graphcuts to generate texture coordinates for each vertex of the dense mesh. Because a texture value is computed for each vertex of the dense mesh, the synthesized textures can be viewed from any distance to a similar extent as those that are obtained with pixel-based algorithms.

Figure 6A:
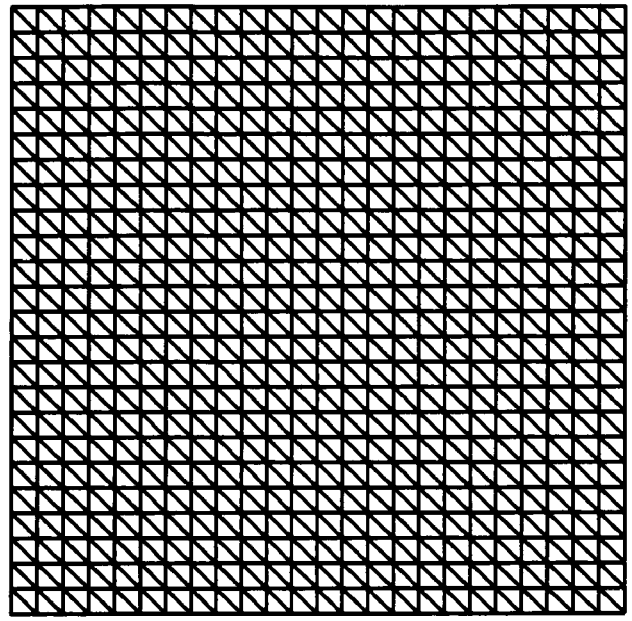
FIGS. 6A-6F illustrate an example surface mesh and sample BTF in the context of an example of a straightforward extension of graphcuts to pattern mapping as compared to an example of results of a GIM-based sampling approach.
Figure 6B:
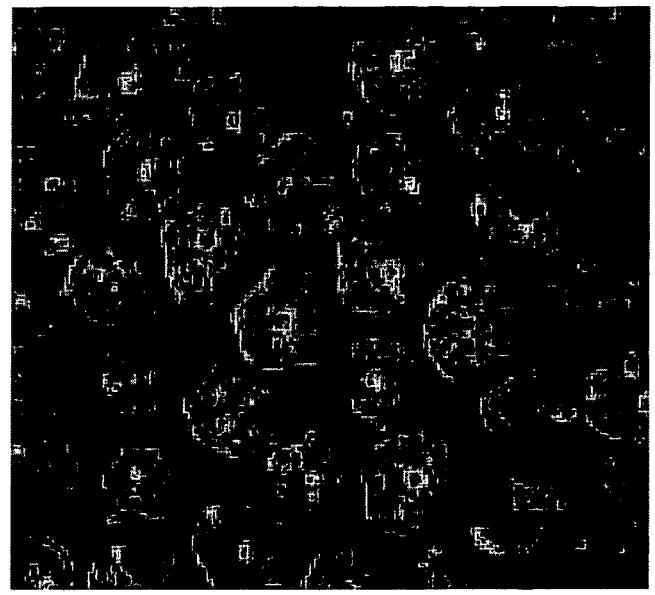
Figure 6C:
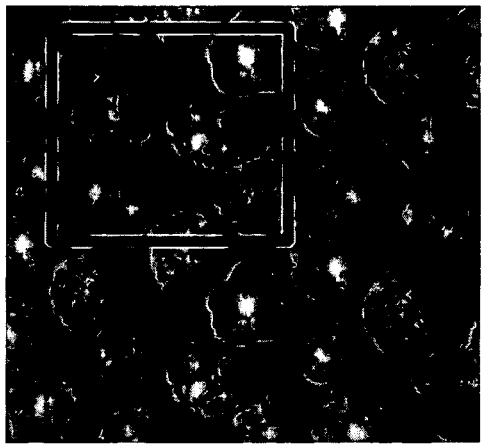
Figure 6D:
Figure 6E:
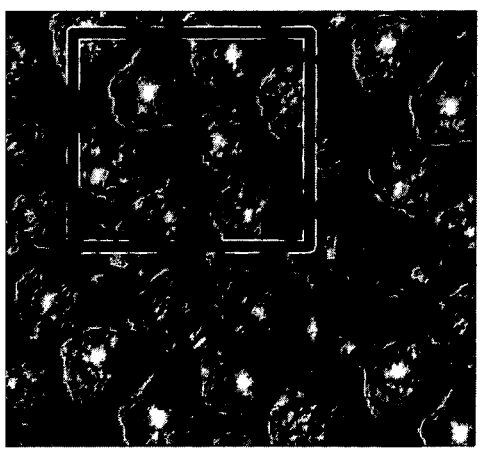
Figure 6F:
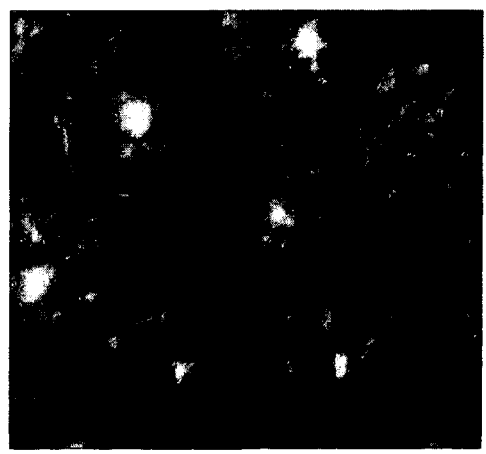

FIGS. 6A-6F illustrate an example surface mesh and sample BTF in the context of an example of a straightforward extension of graphcuts to pattern mapping as compared to an example of results of a GIM-based sampling approach. FIG. 6A is an example of an input surface mesh. FIG. 6B is an example of a BTF sample. FIGS. 6C and 6D illustrate a straightforward extension of graphcuts to pattern mapping. FIGS. 6E and 6F illustrate an example of the results of a GIM-based sampling approach after the tiling of a BTF sample.

As is apparent from FIGS. 6C and 6D, a straightforward extension of graphcuts to hierarchical pattern mapping leads to suboptimal quality, at least when the synthesis results are viewed from a close distance. FIG. 6D is an enlarged version of the area of FIG. 6C that is delineated by a black box. These results are obtained by incorporating graphcuts into pattern mapping, which works directly on the original input mesh. In FIG. 6D (and FIG. 6C, too), patch seams are visible as a disjointed zigzagged or stair-stepped border between patches.

As is apparent from FIGS. 6E and 6F, applying the GIM-based sampling approach to BTF sample tiling results in a visually-improved texture, even from close up. FIG. 6F is an enlarged version of the area of FIG. 6E that is delineated by a black box. The seams are significantly less visible, if visible at all, in FIG. 6F as compared to FIG. 6D.

A second primary challenge addressed in the development of the described system is the difficulty of introducing irregular features into a background pattern, especially in a user-friendly manner. A straightforward approach with graph cut techniques is to merge a foreground feature with the background pattern. For example, the feature may be constrained to a desired location and graph cuts may be used to find the merging seam. However, this approach only supports verbatim copying of existing features.

To enable a user to generate new features, in described implementation(s), a constrained graph cut procedure for texture and BTF painting is presented. For texture synthesis, smoothness energy is considered for finding seams that minimize discontinuity. For texture painting, on the other hand, both smoothness energy and constraint energy are used. Consequently, a user's stipulation of the new feature is incorporated into the graph cut problem as one or more constraints. Generating a new feature with the graphcut painting algorithm is thusly facilitated: the user specifies the rough shape and location of the desired new feature, and a software realization for a described implementation can then synthesize the actual feature and have it merged seamlessly with the background pattern.

It should be noted that the described schemes, mechanisms, techniques, etc. are also applicable to ordinary color textures, which may be regarded as BTFs with a single viewing direction and a single lighting direction.

BTF Synthesis or Tiling

Given a mesh M and an input BTF sample, a dense mesh $M_d$ is built first and then a BTF value for each vertex of $M_d$ is synthesized by quilting patches of the input BTF sample on $M_d$.

GIM-Based Sampling:

As explained herein above, graphcut techniques can be incorporated into a synthesis algorithm that works directly on an original input mesh. For example, texture coordinates can be generated for each triangle of the input mesh. Unfortunately, the synthesis results are not ideal, at least when viewed from a close distance (as shown in FIGS. 6C and 6D). The seams become visible with the pattern mapping approach because two adjacent triangles on the input mesh may be far apart in the texture space. During texture synthesis, textures on two such adjacent triangles are matched at a fixed sampling resolution (which is a parameter of the synthesis algorithm). When synthesis results are viewed at a higher resolution, the seam between the two triangles becomes even more noticeable.

The GIM-based sampling approach described herein provides an effective and general solution for applying graphcut techniques to surfaces. From the input mesh M, the dense mesh $M_d$ is constructed as an MCGIM. MCGIMs are described further in "Multi-chart geometry images" by P. V. Sander, Z. Wood, S. J. Gortler, J. Synder, and H. Hoppe, in Symposium on Geometry Processing 2003, pages 146-155, 2003, which is hereby incorporated by reference in its entirety herein. The MCGIM uses a texture atlas to resample M and zippers chart boundaries to obtain a "watertight" mesh $M_d$.

The texture atlas may be created, for example, using the methods described in "Iso-charts: Stretch-driven mesh parameterization using spectral analysis" by Kun Zhou, John Synder, Baining Guo, and Heung-Yeung Shum, in Symposium on Geometry Processing 2004, pages 47-56, 2004, which is hereby incorporated by reference in its entirety herein. Using these described methods for creating the texture atlas, the input mesh is partitioned into relatively large charts, with the charts being parameterized with minimized stretch.

Figure 7A:
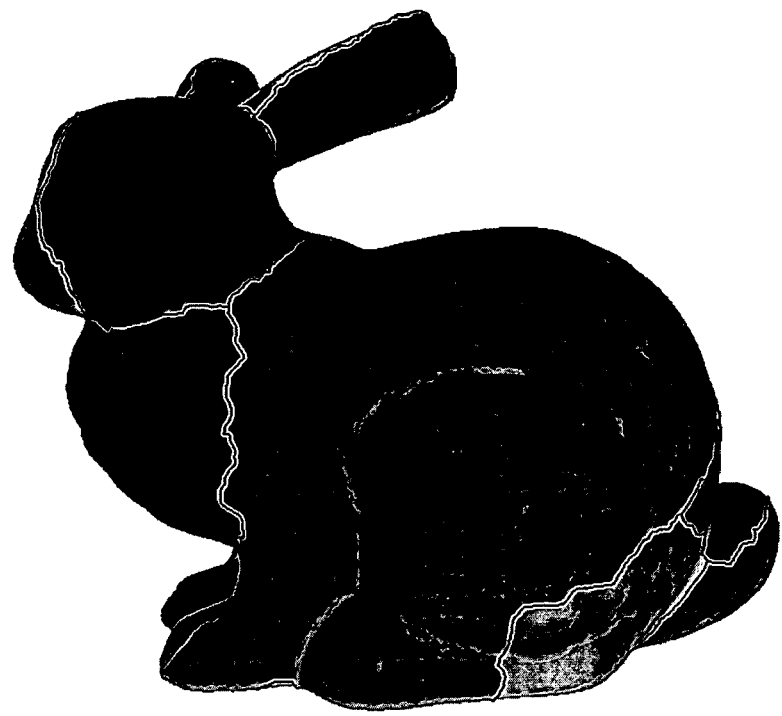
FIGS. 7A-7D illustrate an example construction of a dense mesh from an input mesh for subsequent BTF synthesis.
Figure 7B:
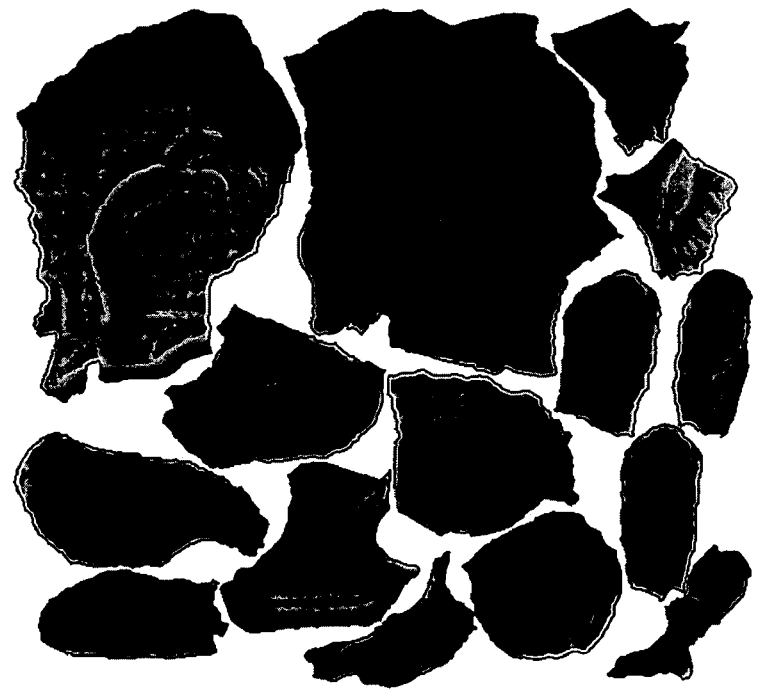
Figure 7C:
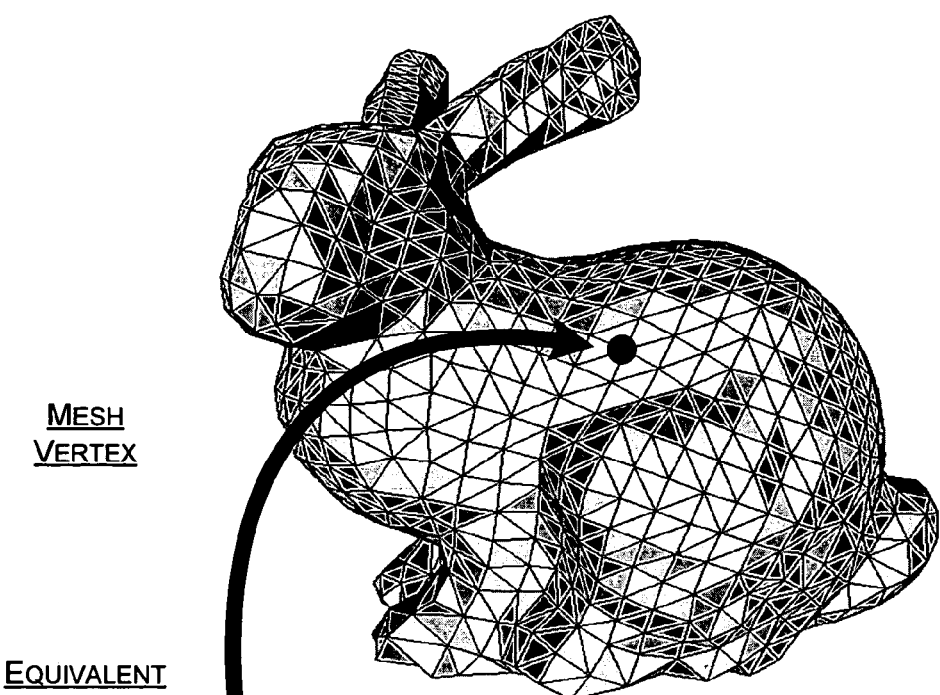
Figure 7D:
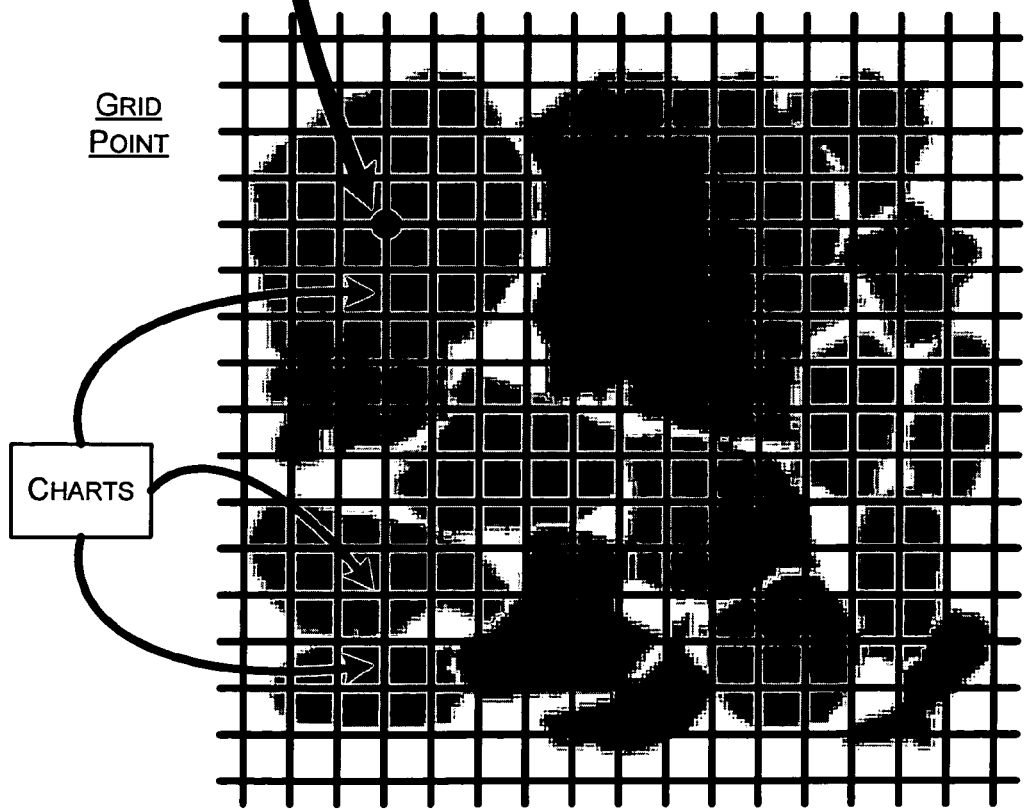

FIGS. 7A-7D illustrate an example construction of a dense mesh from an input mesh for subsequent BTF synthesis. Specifically, FIGS. 7A and 7B show an example texture atlas, and FIGS. 7C and 7D show an example MCGIM. The sampling rate of the MCGIM is a user-specified parameter. Although any values may be used for the sampling rate, example sampling rates include 512×512 and 1024×1024 (which are the values used by the examples illustrated in the accompanying figures).

The dense mesh $M_d$ may be created such that there is a one-to-one correspondence between vertices of $M_d$ and pixels of the texture atlas. Because of this correspondence, synthesizing BTF values for vertices on $M_d$ is equivalent to synthesizing BTF values for pixels of the charts of the texture atlas. The pixel-vertex correspondence makes it easy to flatten a large patch of $M_d$ without introducing noticeable texture distortion. In fact, for a pixel in the interior of a chart, the interior pixel's 2D neighborhood can directly provide neighboring samples and a local flattening. This pixel-vertex correspondence enables (i) simultaneous work on a surface patch of $M_d$ and its corresponding image and (ii) switching freely between the two.

With reference to FIGS. 7A and 7B, an example texture atlas is illustrated over a 3D rabbit. FIG. 7A shows the assembled texture atlas, and FIG. 7B shows the image patches of the texture atlas after disassembly. With reference to FIGS. 7C and 7D, an example multi-chart geometry image mesh (MCGIM) is illustrated for the 3D rabbit. FIG. 7C shows the 3D mesh formed from triangles for the rabbit, and FIG. 7D shows the densely sampled mesh with the image patches flattened into charts. Thus, each chart of the MCGIM corresponds to an image patch of the texture atlas. The charts show the surface being sampled using a regular grid. As indicated by the two dots and the double-headed arrow, each mesh vertex corresponds to a grid point.

Quilting on the Dense Mesh:

From the input of an MCGIM $M_d$ and a BTF sample S, the following pseudo-code can produce BTF values for all vertices of $M_d$:

```
While there are still un-synthesized vertices in M_d do
    pick the most constrained un-synthesized vertex v
    build a work patch P(v) centered at v
    found_work_patch = FALSE
    While found_work_patch == FALSE do
        If P(v) lies inside a single chart
            found_work_patch = TRUE
            obtain the work image I(v) from the chart
        Else
            parameterize P(v) using LSCM
            If parameterization_distortion ≦(distortion) threshold T_d
                found_work_patch == TRUE
                create the work image I(v) by resampling P(v)
            Else
                decrease the size of P(v)
    found_cut = FALSE
    While found_cut == FALSE do
        patch matching in I(v)
        patch fitting in P(v) using graph cuts
        If the optimal seam cost is below (seam cost) threshold T_c
            found_cut = TRUE
        Else
            decrease the size of I(v) and P(v)
    get BTF values for vertices of P(v)
```

The above algorithm can implement texture quilting on the dense mesh.

The algorithm synthesizes the surface BTF by copying patches of the sample BTF. Each time, the next BTF patch $P_b$ that is to be generated is around the un-synthesized vertex v which is the most constrained. The most constrained vertex is the vertex v having the largest number of immediate vertex neighbors that are already synthesized.

Work Patch/Image: To determine the next BTF patch $P_b$, a work patch P(v) centered at v is built first. A breadth-first traversal is conducted starting at v to ascertain P(v). The number of levels in the breadth-first traversal is defined as a user-supplied parameter called the work patch size $r_w$. For a 512×512 MCGIM $M_d$, for example, a typical working patch size is $r_w=32$, but other working patch sizes $r_w$ may be selected. Intuitively, the work patch P(v) may be thought of as a disk of radius $r_w$.

From the work patch P(v), a work image I(v) may be derived using a continuous parameterization of P(v) by considering two cases. The first case is simpler: If the work patch P(v) lies completely inside a chart of the MCGIM $M_d$, then the work image I(v) is the corresponding sub-image of the chart image, and no parameterization or resampling is necessary. The second case is more complex: If the work patch P(v) crosses one or more chart boundaries, then P(v) is parameterized using a least squares conformal mapping (LSCM) technique, and the result is resampled to obtain the work image I(v). An example of an LSCM technique is provided in "Least squares conformal maps for automatic texture atlas generation" by B. L'evy, S. Petitjean, N. Ray, and J.-L. Mallet, in Proceedings of SIGGRAPH 2002, pages 362-371, 2002, which is hereby incorporated by reference in its entirety herein.

To reduce, if not minimize, the texture distortion caused by LSCM, the area distortion is monitored by a distortion threshold $T_d$. Although other values may be used, an example value for distortion threshold $T_d$ is 4. For resampling, the sampling step is set to the average edge length of the work patch.

If a sampling point p is located in a triangle with three synthesized vertices, the BTF value at point p is interpolated from these three vertices and the sampling point is marked as synthesized. Otherwise, the point p is marked as un-synthesized. In this manner, a partially-synthesized work image T(v) is obtained.

Figure 8A:
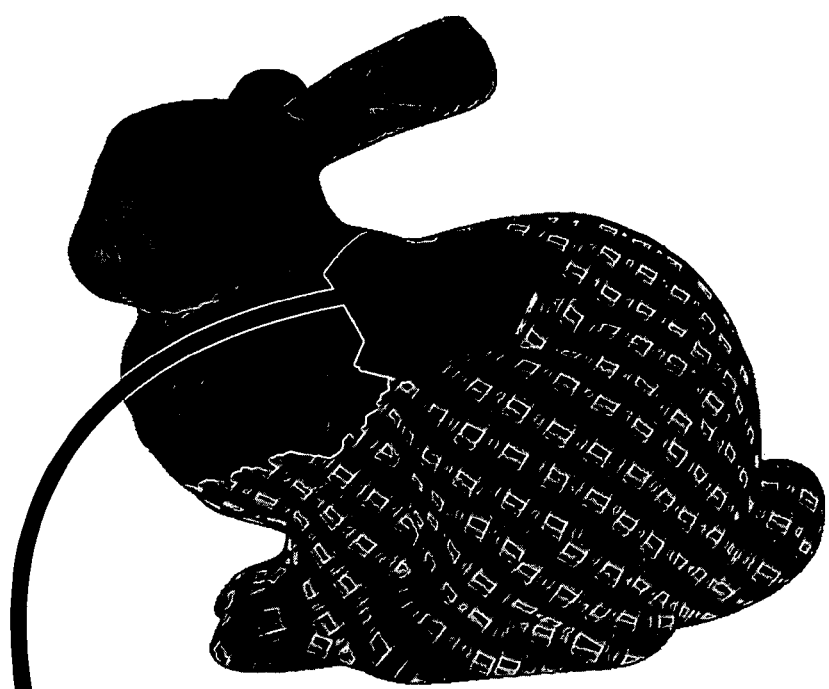
FIGS. 8A-8D illustrate an example BTF synthesis using a work patch and a work image.
Figure 8B:
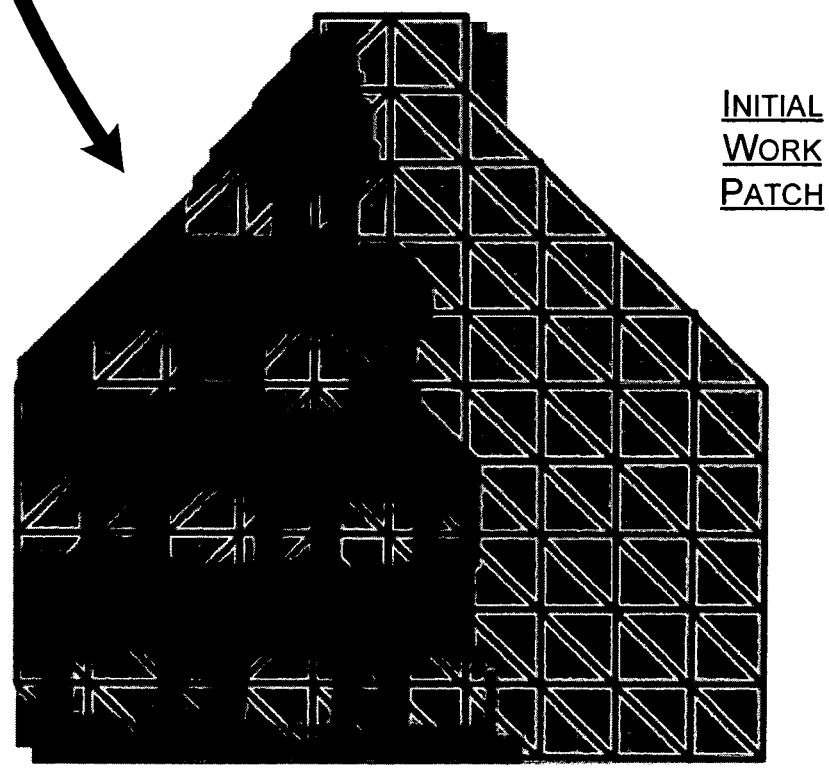
Figure 8C:
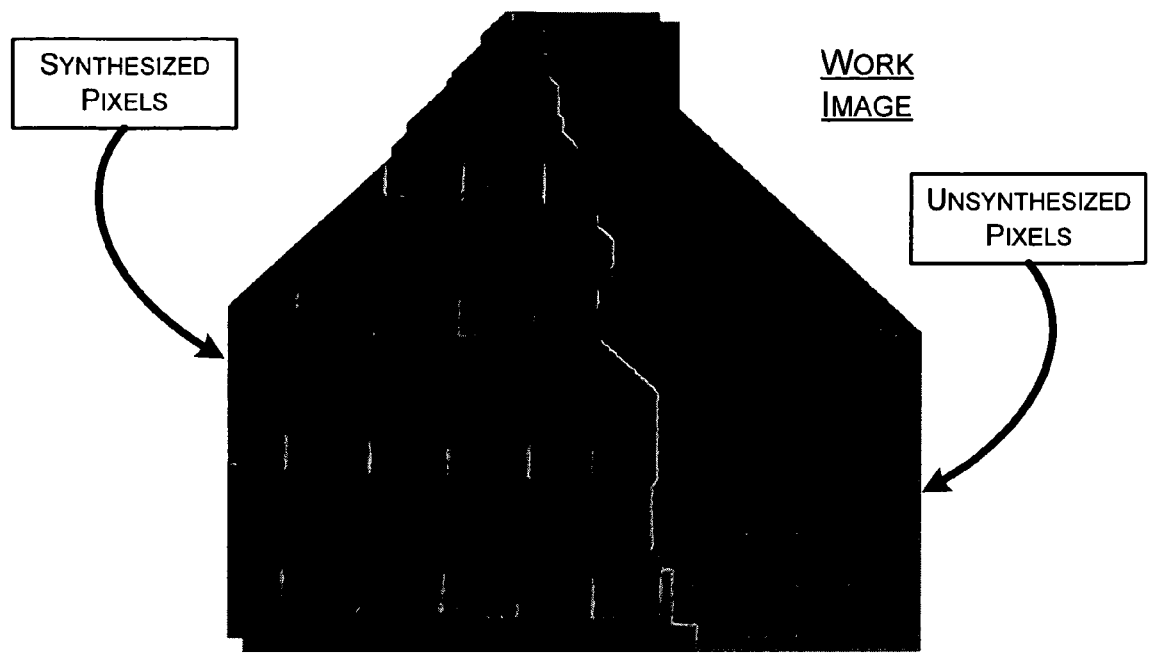
Figure 8D:
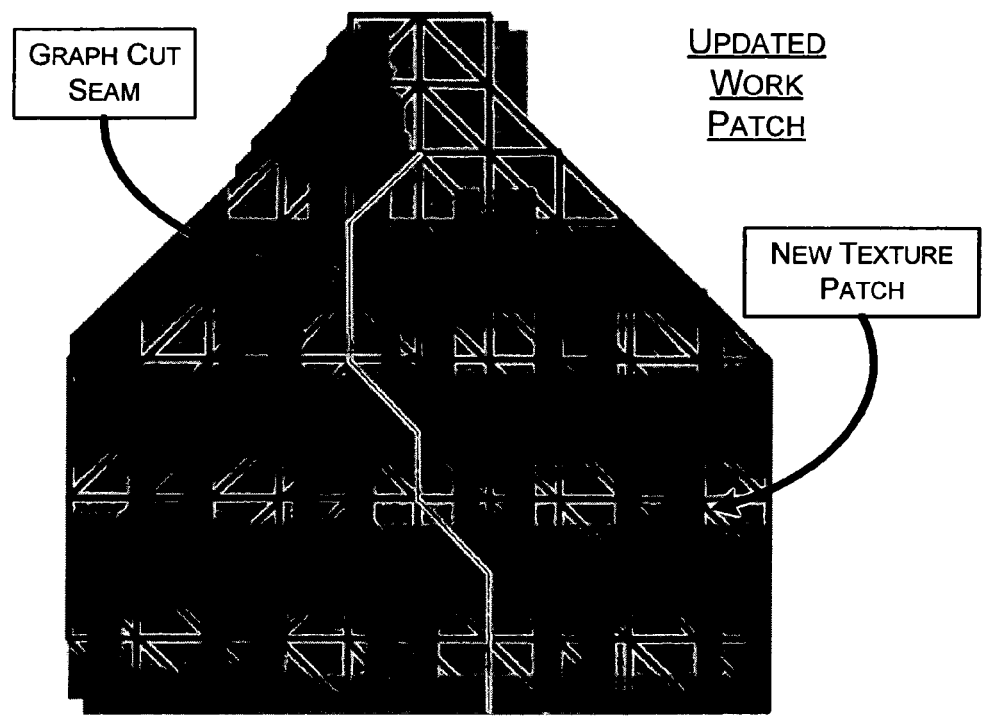

FIGS. 8A-8D illustrate an example BTF synthesis using a work patch and a work image. FIG. 8A shows the finding of a work patch on the target surface. FIG. 8B shows the initial work patch. FIG. 8C shows the work image in a state in which there are synthesized and un-synthesized pixels. FIG. 8D shows the work patch after the fitting of a new texture patch; the graph cut seam is also specifically indicated.

After building the work patch and image, the next BTF patch $P_b$ can be determined using graph cuts. For quilting with graph cuts, the main tasks are patch matching and patch fitting. Patch matching places a candidate patch (e.g., the input sample) over a target area by comparing the candidate patch and the synthesized pixels in the target area. Patch fitting applies graph cuts to select a piece of the candidate patch to be the next synthesized BTF patch $P_b$.

Patch Matching: Patch matching is performed in the work image I(v). An example of a suitable general patch-matching technique is presented in "Graphcut textures: Image and video synthesis using graph cuts" by Vivek Kwatra, Arno Schödl, Irfan Essa, Greg Turk, and Aaron Bobick, in ACM Transactions on Graphics, 22(3):277-286, July 2003, which is hereby incorporated by reference in its entirety herein. The sum-of-squared-differences (SSD) cost for the BTF is normalized within the area of the overlap region between the input sample and the work image, and the patch placement with the minimal cost is selected for patch fitting. The SSD-based search may be accelerated using Fast Fourier Transform (FFT).

However, patch matching need not be limited solely to translation as in general approaches. In described implementation(s), instead of relying on only translations, patch matching employs both translations and rotations. The rotation capability helps to handle the 3D nature of the original target surface.

In other words, surface quilting involves a vector field, and the described rotational aspect of patch matching accommodates the difference. The vector field aides in orienting anisotropic textures on surfaces and for BTF rendering, which involves a local frame at each surface point. In an implementation of a software program for BFT texture synthesis, a user interface is provided to let the user specify vectors at a few relatively "key" faces. These vectors are then interpolated to other faces using radial basis functions.

During patch matching, an average orientation for the work image is calculated using the vector field on the work patch. The average orientation is then used to align the input BTF sample S for patch matching. For computational efficiency, a predetermined number of rotated versions of S may be pre-computed. (For the illustrated examples, 72 pre-computed rotation versions are used.) During patch matching, the best pre-computed rotated version of S is selected for use during patch fitting.

Patch Fitting: After the input sample S is placed over the work image I(v) by patch matching, the input sample S can be mapped onto the work patch P(v) using the correspondence between I(v) and P(v) (i.e., each grid point or pixel of work image I(v) corresponds to a vertex of work patch P(v)).

Each vertex of the work patch P(v) that is covered by the mapped and rotated input sample S is assigned a new BTF value. Each already-synthesized vertex of the work patch P(v) also has an old BTF value. Based on these old and new BFT values, a graph cuts technique is applied to select a piece of the input sample S by regarding the vertices of the work patch P(v) as graph nodes and the edges of the work patch P(v) as graph edges. The new BTF values of the selected piece of the input sample S are copied or assigned to the vertices of the work patch P(v) if the seam cost is below a predetermined cost threshold $T_c$. It should be noted that the Kwatra document as referenced hereinabove presents an approach for accounting for old seams from previous graph cut steps.

Hierarchical Search: To achieve relatively higher-quality results, a piece of the input sample S that is selected by the graph cuts technique is utilized if the seam cost is below a seam cost threshold $T_c$. If the seam cost exceeds the seam cost threshold $T_c$, the work patch size $r_w$ is decreased and the search process is repeated. For example, the work patch size $r_w$ may be reduced by a constant factor, and then the search for another, better piece of the input sample S is commenced. (For the illustrated examples, the constant reduction factor is set to 0.8.)

The work patch size $r_w$ may be decreased one or more times until the seam cost falls below the seam cost threshold $T_c$, or until the work patch size $r_w$ reaches a minimum size. (For the illustrated examples, the minimum size of the work patch size $r_w$ is 4.) The same hierarchical search strategy can be employed to control the area distortion of the LSCM parameterization when the work patch is built.

Handling BTF Values: The BTF sample is a six dimensional (6D) function $f(x, v, l)$, where $x=(x, y)$ is the texture coordinate. $v=(\theta_v, \phi_v)$ and $l=(\theta_l, \phi_l)$ are the viewing and lighting directions, respectively, in spherical coordinates.

For each texel $x=(x, y)$, the BTF value is a 4D function that is discretized into a high dimensional vector. Careful treatment of this high dimensional vector can be beneficial when storing BTFs and/or calculating SSD costs during patch matching and patch fitting. For example, for efficient storage of various BTFs, including rotated copies of the input sample S and the synthesized surface BTFs, storage can be limited to the texture coordinates. Upon request, the actual BTF value is retrieved from the input sample S using texture coordinates.

Figure 9:
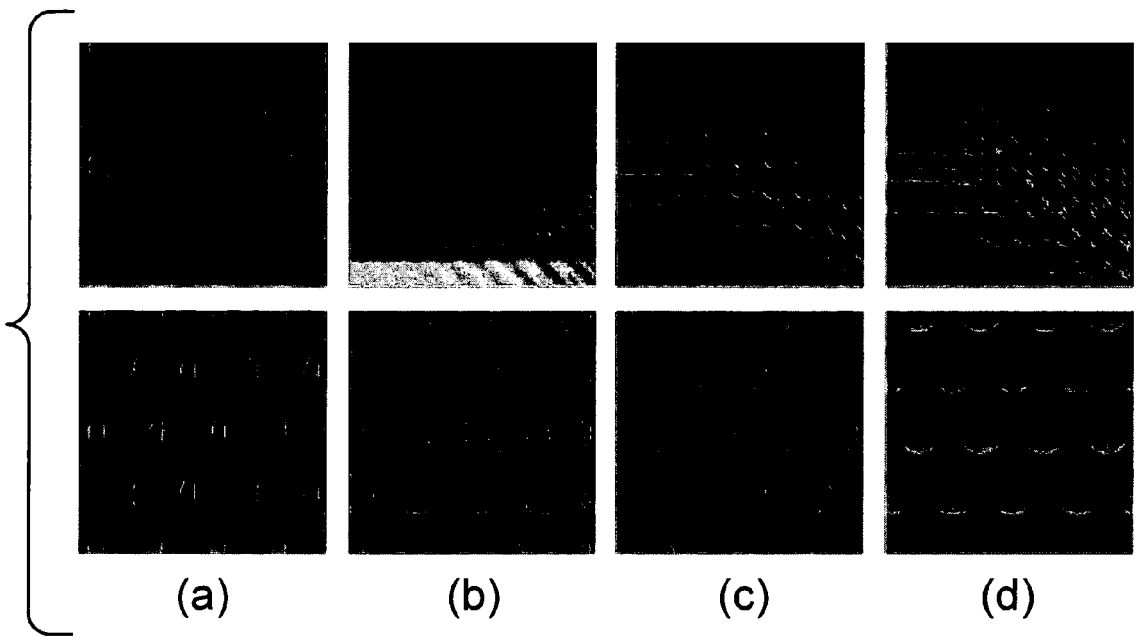
FIG. 9 illustrates an example SVD factorization of a BTF sample.

For efficient SSD cost calculation, the BTF may be factorized as a sum of products of 2D and 4D functions using singular value decomposition (SVD). An example equation representing such an SVD is:

$$f(x, v, l) \approx \sum_{i=1}^{n} g_i(x) p_i(v, l),$$

where $g_i(x)$ is termed a geometry map and $p_i(v, l)$ is termed an eigen point appearance function (PAF). FIG. 9 illustrates an example SVD factorization of a BTF sample. More specifically, it is an example SVD factorization of a 128×128 BTF sample with the viewing and lighting resolution equal to 12×8×12×8. FIG. 9(a) shows two images of a sample BTF with different viewing and lighting directions. FIGS. 9(b), 9(c), and 9(d) show three relatively significant eigen PAFs (along the top row) and geometry maps (along the bottom row). A 4D PAF is packed into the 2D image of FIG. 9; each row corresponds to a varying light direction, and each column corresponds to a varying view direction.

The geometry maps depend on texture coordinates only, but the PAFs are a function of the viewing and lighting directions. An algorithm that synthesizes a surface BTF using the corresponding geometry maps may be used. In fact, for the illustrated examples, this algorithm is adopted for surface quilting with n=40, and the SSD costs are calculated with low-dimensional vectors.

For ordinary color textures, vertex colors are stored directly into $M_d$ to thereby create a texture map (e.g., usually of a size of 512×512 or 1024×1024 for the examples included herein). With this created texture map, the synthesized surface texture can be rendered using the standard texture mapping pipeline.

BTF Painting

BTF painting can be applicable, for example, in the following scenario: A sample texture S has a foreground feature over a background pattern. The background pattern is already synthesized onto a target mesh M. In accordance with described implementation(s), a BTF painting system enables a user to interactively synthesize new foreground features on the target mesh M by roughly specifying their shapes and locations. In this scenario, it is assumed that prior to the foreground synthesis the user has roughly specified the foreground feature(s) in the BTF sample S.

As noted herein above in the qualitative section, a described implementation of the painting system utilizes a graphcut texture painting algorithm that minimizes both smoothness energy and constraint energy to build a quilt of patches.

Figure 10A:
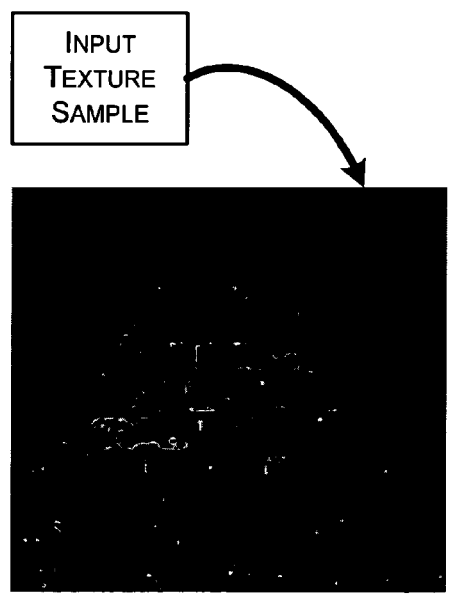
FIGS. 10A-10D illustrate the construction or painting of a constrained quilt with an irregular feature for a foreground texture.
Figure 10B:
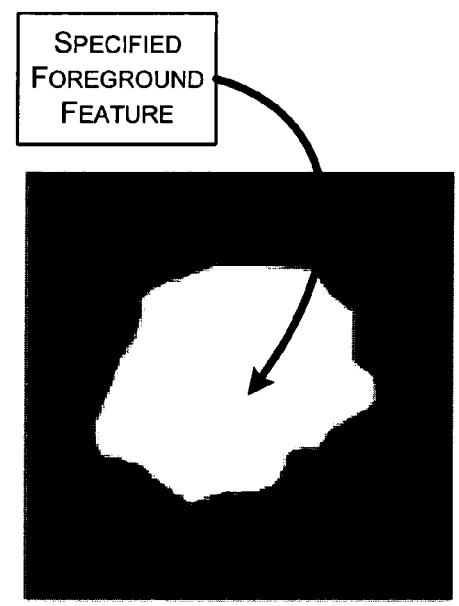
Figure 10C:
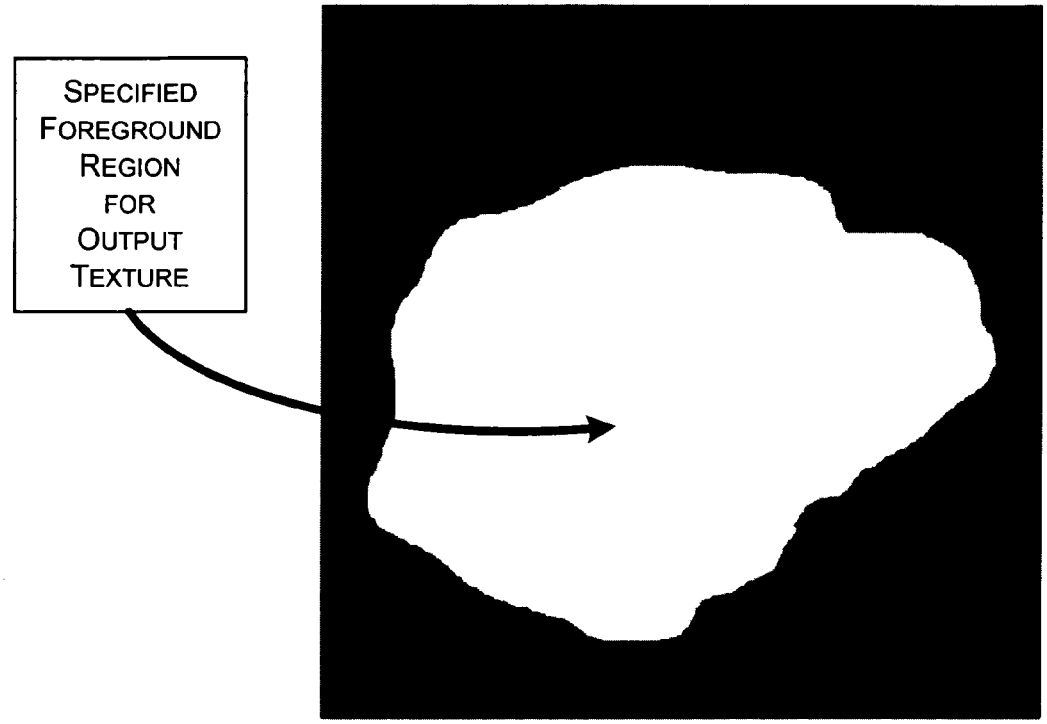

FIGS. 10A-10D illustrate the construction or painting of a constrained quilt for an irregular feature for a foreground texture. FIG. 10A shows an input texture sample. The input texture may be considered to have a regular texture portion and an irregular texture portion. FIG. 10B shows how a foreground feature may be specified by a user. The foreground feature is the white portion of the input texture sample and is considered to be an irregular portion in this example. FIG. 10C shows a foreground region that is specified by a user for the output texture. The foreground region is the white portion.

Figure 10D:
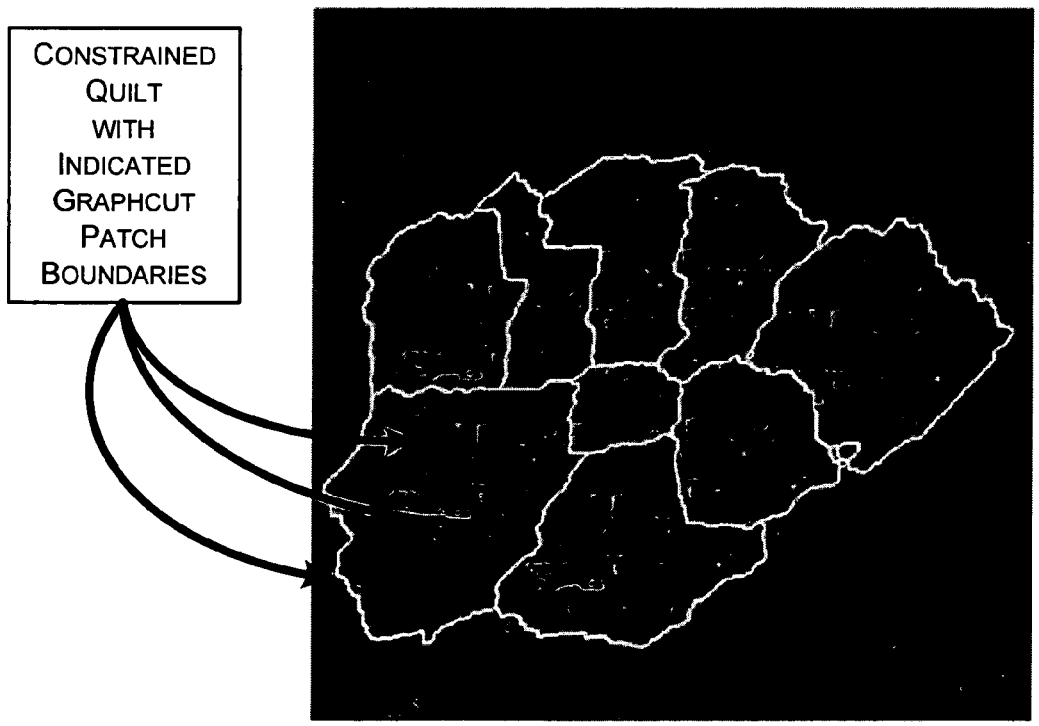

FIG. 10D shows the resulting constructed constrained quilt. The graphcut patch boundaries are also indicated.

Graphcut Texture Painting:

The graphcut texture painting in this example results in the construction of a constrained quilt Q. The input sample texture S has been partitioned into two parts by a user: a background pattern $S_b$ and a foreground feature $S_f$. In the target mesh M, the user has also specified a foreground region F. The constrained quilt Q(F) is a quilt consisting of patches of M such that Q(F) covers F and each patch of Q(F) is directly texture-mapped from a patch in the input sample S. The constraint on Q(F) is that F is textured by the foreground feature $S_f$.

To construct the constrained quilt Q(F) using graph cuts, the user-specified constraints are encoded as constraint functions. A function $m_0$ is defined on the target mesh M such that $m_0(p)=1$ if point p belongs to F and $m_0(p)=0$ otherwise. Similarly, for every patch P of the constraint quilt Q(F), a function $m_p$ is defined such that $m_p(p)=1$ if point p belongs to the foreground feature and $m_p(p)=0$ otherwise. With these functions defined, a constrained graph cut technique, which is a part of graphcut texture painting, is described.

Constrained Graph Cuts: For the sake of clarity, constrained graph cuts is described for image textures. By way of explanation only, two overlapping constrained patches A and B are addressed. Each pixel p of patch A has a texture value $f_A(p)$ and a constraint value $m_A(P)$. Similarly, each pixel p of patch B has a texture value $f_B(p)$ and a constraint value $m_B(P)$. Finally, for each pixel p of the overlapping region, there is a user-specified constraint value $m_0(p)$.

Figure 11:
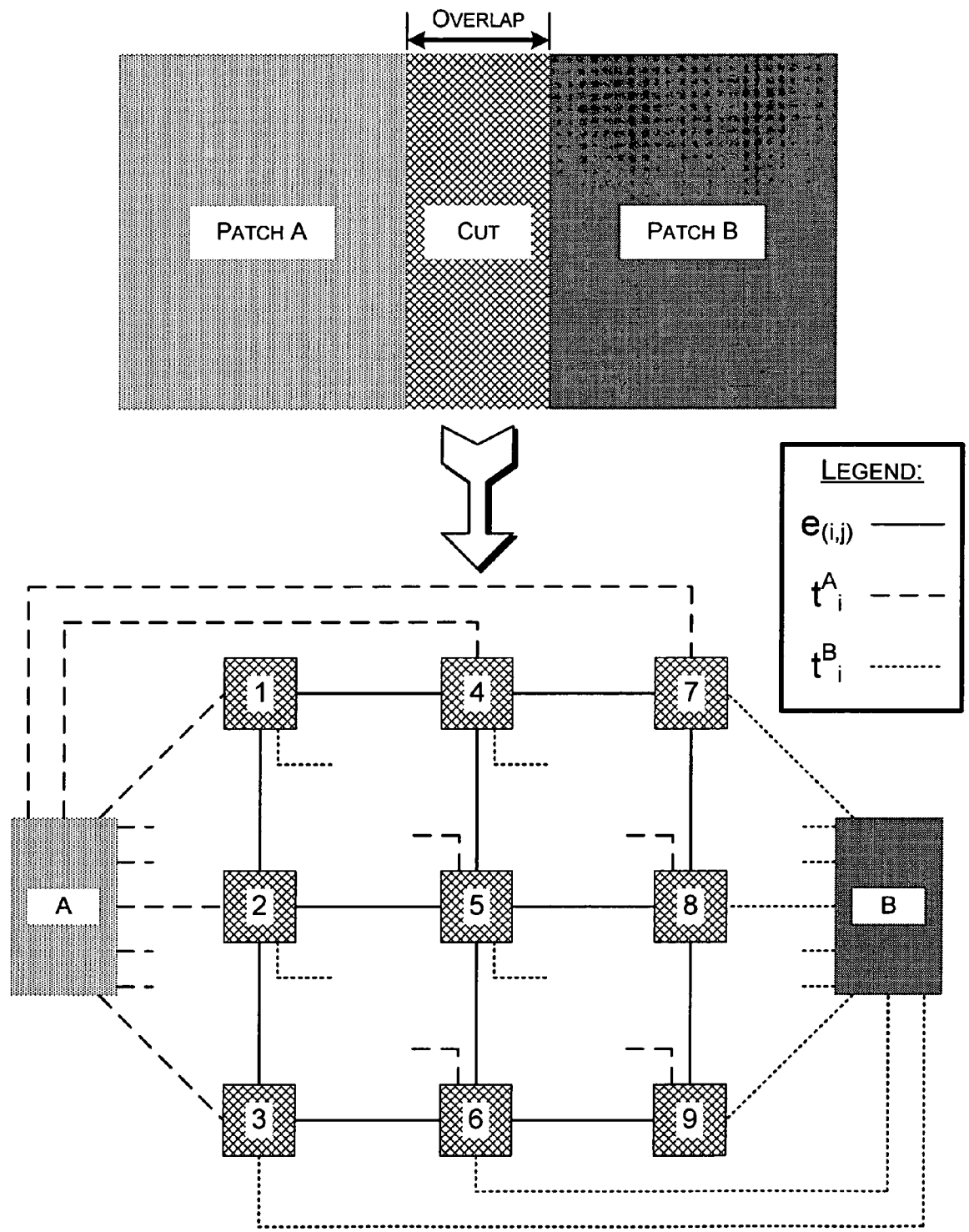
FIG. 11 illustrates a graphical formulation of a seam finding problem for graphcut texture painting.

FIG. 11 illustrates a graphical formulation of a seam finding problem for graphcut texture painting. The top portion of FIG. 11 shows a patch A, a patch B, and a cut or overlapping region. The bottom portion shows patch A, patch B, and individual pixels of the overlapping region, as well as links between and among them.

A goal is to assign a patch label $\sigma_p$ to every pixel p in the overlapping region ($\sigma_p$=A or B), so that the region is divided into two parts by a seam of minimum cost (energy). The energy that is minimized is defined as $$E(\sigma)=E_{data}(\sigma)+E_{smooth}(\sigma).$$

In general graph cut problems, the smoothness energy $E_{smooth}$ measures the extent to which σ is not smooth, and the data energy $E_{data}$ measures the difference between σ and some known data. On the other hand, for graphcut texture painting, $E_{smooth}$ measures how well the patches fit together along their seams, and $E_{data}=E_{constraint}$ measures how well the synthesized texture satisfies the user specified constraint $m_0$.

Fitting patches together while minimizing $E_{smooth}$ along the seams is performed in the same manner as graphcut texture synthesis. The energy $E_{smooth}$ is defined as $$E_{smooth}(\sigma) = \sum_{p,q} V_{(p,q)}(\sigma_p, \sigma_q),$$

where $\Sigma_{p,q}$ is the sum over the pairs of adjacent pixels in the overlapping region. The smoothness function $V_{(p,q)}(\sigma_p, \sigma_q)$ is defined as $$V_{(p,q)}(\sigma_p,\sigma_q)=\|f_{\sigma_p}(p)-f_{\sigma_q}(p)\|+\|f_{\sigma_p}(q)-f_{\sigma_q}(q)\|,$$

where $f_A(p)$ and $f_B(p)$ are pixel p's texture values for patch A and patch B, respectively.

For graphcut texture painting, the user specified constraint $m_0$ is also satisfied. This is how graphcut texture painting differs from graphcut texture synthesis, which uses $E_{smooth}$ but not the user specified constraint $m_0$. The user specified constraint $m_0$ is incorporated into graphcut texture painting or quilting by making use of the energy $E_{data}$. The energy $E_{data}$ is defined as $$E_{data}(\sigma) = E_{constraint}(\sigma) = \sum_p D_p(\sigma_p),$$

where $\Sigma_p$ is the sum over the pixels in the overlapping region. The function $D_p(\sigma_p)$ is defined as $$D_p(\sigma_p)=\|m_{\sigma_p}(p)-m_0(p)\|,$$

where $m_{\sigma_p}(p)$ is the constraint value of patch $\sigma_p$ at pixel p, while $m_0(p)$ is the user specified constraint value at pixel p.

An optimal swap move approach is used to minimize the energy E(σ). An example of a suitable optimal swap move technique is presented in "Fast approximate energy minimization via graph cuts" by Yuri Boykov, Olga Veksler, and Ramin Zabih, in IEEE Trans on Pattern Analysis and Machine Intelligence, 23(11):1-18, November 2001, which is hereby incorporated by reference in its entirety herein.

The bottom portion of FIG. 11 illustrates a graph construction for implementing an optimal swap move technique. The nodes of the graph are (i) the pixels (numbered 1-9) in the overlapping region and (ii) the two terminals A and B. Each pixel p in the overlapping region is connected to the terminals A and B by edges $t_p^A$ and $t_p^B$, respectively. These edges are referred to as t-links (terminal links). Each pair of the adjacent pixels (p,q) in the overlapping region is connected by an edge $e_{(p,q)}$ called an n-link (neighbor link). The weights of the edges are weight($t_p^A$)=$D_p(A)$, weight($t_p^B$)=$D_p(B)$, and weight($e_{(p,q)}$)=$V_{(p,q)}(A,B)$.

Applying the min-cut algorithm to the constructed graph produces the minimum cost cut that separates node A from node B. In a described implementation, any cut in the graph is to include exactly one t-link for any pixel p. Thus, any cut leaves each pixel p in the overlapping region with exactly one t-link, which defines a natural label $\sigma_p$ according to the minimum cost cut C, such that $\sigma_p$ is $$\sigma_p = \begin{cases} A & t_p^A \in C \\ B & t_p^B \in C \end{cases}.$$

The approach for handling old seams in graphcut texture synthesis also works with graphcut texture painting.

Quilting on Surfaces: The surface quilting algorithm described herein above in the context of graphcut texture synthesis can be adopted for graphcut texture painting on surfaces with modifications to the patch matching and patch fitting phases. For patch matching, both the BTF values and the constraint values (the $m_s$ and $m_0$ values) are used to perform a joint search for optimal patch placement. For patch fitting, a constrained graph cut is employed.

Painting System Software Example

Implementation(s) as described herein can be realized as a painting system software program that has, for example, a graphical user interface (GUI). For user interactivity reasons, surfaces are not immediately rendered with the BTF. Instead, an ordinary color texture is displayed that provides a quick preview of the actual BTF. The color texture is obtained from one of the BTF images (e.g., the one with the front parallel view and head-on lighting).

The example painting system modifies the user-specified constraint function $m_0$ to improve the quality of the constrained quilt. As described above, the user specifies the foreground region F on the target surface and thus defines the constraint $m_0$ such that that $m_0=1$ over F and $m_0=0$ elsewhere. Unfortunately, $m_0$ defined in this way can result in an abrupt change along the boundary of F. This abrupt change often leads to destroyed texture patterns in nearby areas.

Figure 12:
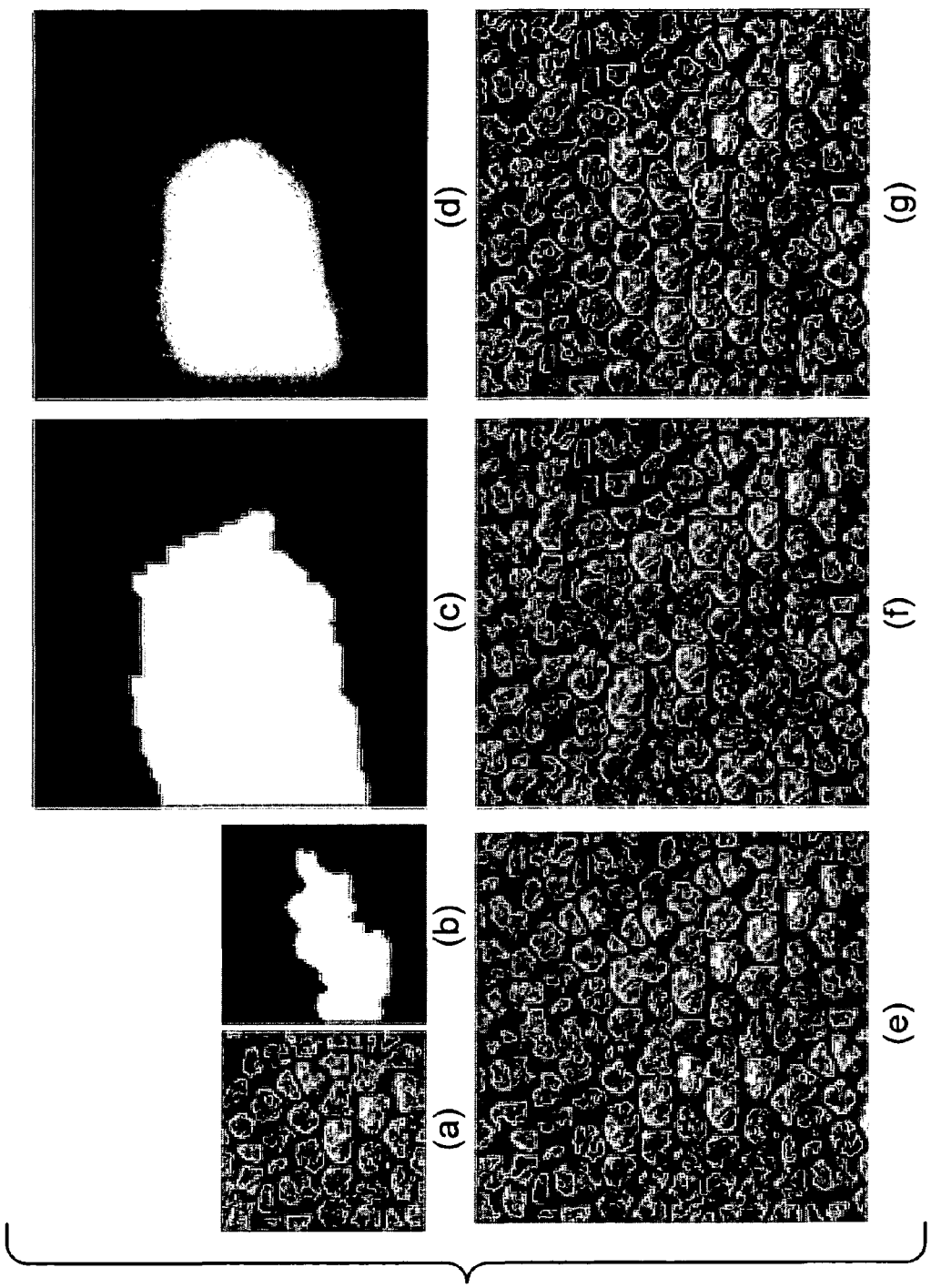
FIG. 12 illustrates an input texture sample and resulting decorated surfaces under different example constraint function $m_0$ scenarios.

FIG. 12 illustrates an input texture sample and resulting decorated surfaces under different example constraint function $m_0$ scenarios. FIG. 12(a) shows the input texture sample. FIG. 12(b) shows the demarcation of the user-specified foreground feature of the input texture sample. FIG. 12(c) shows the delineation of the user-specified foreground region (e.g., the user-specified constraint function $m_0$) for the output texture. FIG. 12(f) shows how defining $m_0$ as described above and as shown in FIG. 12(c) can result in an abrupt change along the boundary of F, which can deteriorate adjacent texture areas. It is apparent that there are broken texture patterns in the orange area.

One (relatively naive) approach to ameliorating this problem is to weaken $m_0$ as $m_0=\lambda$ over F and $m_0=0$ elsewhere for some small $\lambda$. From the definition of the data energy $E_{data}$, if $m_0$ is set to a small value $\lambda$, $E_{data}$ plays a less important role in the total objective energy. However, when $\lambda$ is small, $m_0$ ceases to be fully effective, and some background elements may start to appear in F as shown in FIG. 12(e).

Another approach that reduces if not eliminates the appearance of background elements in the foreground is as follows: A transition zone from the boundary of F is expanded, and the values of $m_0$ in the transition zone are interpolated using linear interpolation. The transition zone with an interpolated constraint function $m_0$ is shown in FIG. 12(d) as a blurring of the black and white division between the background and the foreground. Optionally, an example of painting system software may permit the width of the transition zone to be a user-adjustable parameter. FIG. 12(g) shows a synthesis result when a transition zone established by an interpolated constraint function $m_0$ is employed.

In addition to synthesizing new foreground features, an example of the painting system software also supports verbatim copying of the foreground feature from the input sample onto the target surface. An optional useful feature of the example painting system provides previews with verbatim copying operations by directly projecting a stipulated foreground feature onto the targeted surface. Although the projected foreground feature is not seamlessly merged with the background, the preview still provides valuable visual feedback. Thus, the user can slide the foreground feature around the surface to find a desired pasting location; the foreground feature can then be mapped onto the surface relatively quickly using the work patch/image at the target location.

The devices, actions, aspects, features, functions, procedures, modules, data structures, components, etc. of FIGS. 1-12 are illustrated in diagrams that are divided into multiple blocks. However, the order, interconnections, interrelationships, layout, etc. in which FIGS. 1-12 are described and/or shown is not intended to be construed as a limitation, and any number of the blocks can be modified, combined, rearranged, augmented, omitted, etc. in any manner to implement one or more systems, methods, devices, procedures, media, apparatuses, APIs, arrangements, etc. for decorating surfaces with textures. Furthermore, although the description herein includes references to specific implementations (including a general device of FIG. 13), the illustrated and/or described implementations can be implemented in any suitable hardware, software, firmware, or combination thereof and using any suitable texture sample(s), graphcut algorithm(s), mesh density-increasing mechanism(s), patch fitting technique(s), user interface approach(es), and/or energy minimization procedure(s), and so forth.

Example Operating Environment for Computer or Other Device

Figure 13:
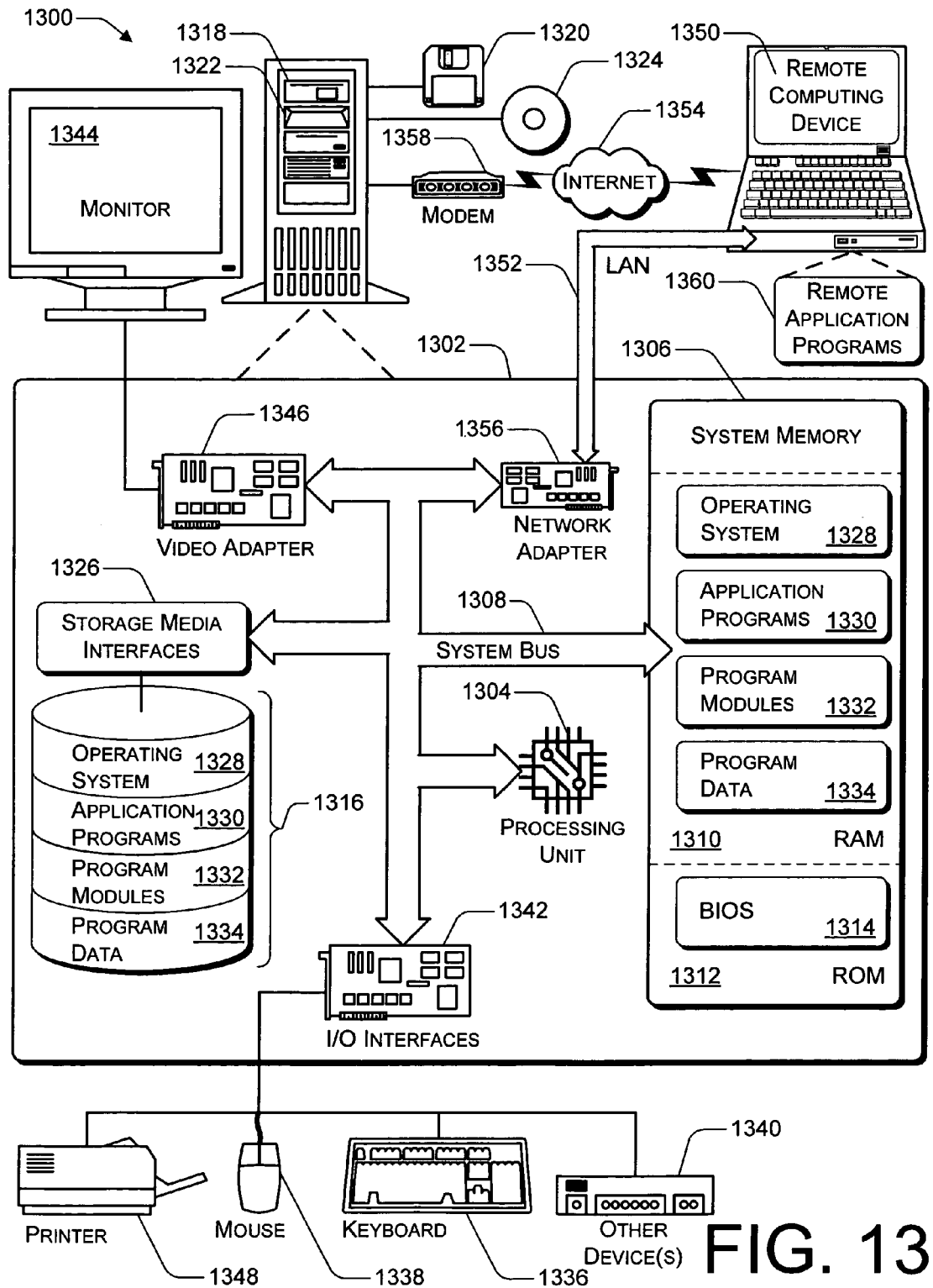
FIG. 13 illustrates an example of a computing (or general device) operating environment that is capable of (wholly or partially) implementing at least one aspect of decorating surfaces with textures as described herein.

FIG. 13 illustrates an example computing (or general device) operating environment 1300 that is capable of (fully or partially) implementing at least one system, device, apparatus, component, arrangement, protocol, approach, method, procedure, media, application programming interface (API), some combination thereof, etc. for decorating surfaces with textures as described herein. Operating environment 1300 may be utilized in the computer and network architectures described below.

Example operating environment 1300 is only one example of an environment and is not intended to suggest any limitation as to the scope of use or functionality of the applicable device (including computer, network node, entertainment device, mobile appliance, general electronic device, etc.) architectures. Neither should operating environment 1300 (or the devices thereof) be interpreted as having any dependency or requirement relating to any one or to any combination of components as illustrated in FIG. 13.

Additionally, implementations for decorating surfaces with textures may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for decorating surfaces with textures may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of surface decorating with textures, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 1300 includes a general-purpose computing device in the form of a computer 1302, which may comprise any (e.g., electronic) device with computing/processing capabilities. The components of computer 1302 may include, but are not limited to, one or more processors or processing units 1304, a system memory 1306, and a system bus 1308 that couples various system components including processor 1304 to system memory 1306.

Processors 1304 are not limited by the materials from which they are formed or the processing mechanisms employed therein. For example, processors 1304 may be comprised of semiconductor(s) and/or transistors (e.g., electronic integrated circuits (ICs)). In such a context, processor-executable instructions may be electronically-executable instructions. Alternatively, the mechanisms of or for processors 1304, and thus of or for computer 1302, may include, but are not limited to, quantum computing, optical computing, mechanical computing (e.g., using nanotechnology), and so forth.

System bus 1308 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1302 typically includes a variety of processor-accessible media. Such media may be any available media that is accessible by computer 1302 or another (e.g., electronic) device, and it includes both volatile and non-volatile media, removable and non-removable media, and storage and transmission media.

System memory 1306 includes processor-accessible storage media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is typically stored in ROM 1312. RAM 1310 typically contains data and/or program modules/instructions that are immediately accessible to and/or being presently operated on by processing unit 1304.

Computer 1302 may also include other removable/non-removable and/or volatile/non-volatile storage media. By way of example, FIG. 13 illustrates a hard disk drive or disk drive array 1316 for reading from and writing to a (typically) non-removable, non-volatile magnetic media (not separately shown); a magnetic disk drive 1318 for reading from and writing to a (typically) removable, non-volatile magnetic disk 1320 (e.g., a "floppy disk"); and an optical disk drive 1322 for reading from and/or writing to a (typically) removable, non-volatile optical disk 1324 such as a CD, DVD, or other optical media. Hard disk drive 1316, magnetic disk drive 1318, and optical disk drive 1322 are each connected to system bus 1308 by one or more storage media interfaces 1326. Alternatively, hard disk drive 1316, magnetic disk drive 1318, and optical disk drive 1322 may be connected to system bus 1308 by one or more other separate or combined interfaces (not shown).

The disk drives and their associated processor-accessible media provide non-volatile storage of processor-executable instructions, such as data structures, program modules, and other data for computer 1302. Although example computer 1302 illustrates a hard disk 1316, a removable magnetic disk 1320, and a removable optical disk 1324, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 1300.

Any number of program modules (or other units or sets of processor-executable instructions) may be stored on hard disk 1316, magnetic disk 1320, optical disk 1324, ROM 1312, and/or RAM 1310, including by way of general example, an operating system 1328, one or more application programs 1330, other program modules 1332, and program data 1334. These processor-executable instructions may include, for example, one or more of: a surface decorator; a surface tiler; a surface painter; a target surface; a BTF sample; a tiled surface; a tiled and painted surface; patches, images, or other intermediate data; some combination thereof; and so forth.

A user may enter commands and/or information into computer 1302 via input devices such as a keyboard 1336 and a pointing device 1338 (e.g., a "mouse"). Other input devices 1340 (not shown specifically) may include a microphone, joystick, game pad, satellite dish, serial port, video camera, scanner, and/or the like. These and other input devices are connected to processing unit 1304 via input/output interfaces 1342 that are coupled to system bus 1308. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1344 or other type of display device may also be connected to system bus 1308 via an interface, such as a video adapter 1346. Video adapter 1346 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1344, other output peripheral devices may include components such as speakers (not shown) and a printer 1348, which may be connected to computer 1302 via input/output interfaces 1342.

Computer 1302 may operate in a networked environment using logical connections to one or more remote computers, such as a remote computing device 1350. By way of example, remote computing device 1350 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1350 is illustrated as a portable computer that may include many or all of the elements and features described herein with respect to computer 1302.

Logical connections between computer 1302 and remote computer 1350 are depicted as a local area network (LAN) 1352 and a general wide area network (WAN) 1354. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth.

Such networks and logical and physical communications connections are additional examples of transmission media.

When implemented in a LAN networking environment, computer 1302 is usually connected to LAN 1352 via a network interface or adapter 1356. When implemented in a WAN networking environment, computer 1302 typically includes a modem 1358 or other component for establishing communications over WAN 1354. Modem 1358, which may be internal or external to computer 1302, may be connected to system bus 1308 via input/output interfaces 1342 or any other appropriate mechanism(s). It is to be appreciated that the illustrated network connections are examples and that other manners for establishing communication link(s) between computers 1302 and 1350 may be employed.

In a networked environment, such as that illustrated with operating environment 1300, program modules or other instructions that are depicted relative to computer 1302, or portions thereof, may be fully or partially stored in a remote media storage device. By way of example, remote application programs 1360 reside on a memory component of remote computer 1350 but may be usable or otherwise accessible via computer 1302. Also, for purposes of illustration, application programs 1330 and other processor-executable instructions such as operating system 1328 are illustrated herein as discrete blocks, but it is recognized that such programs, components, and other instructions reside at various times in different storage components of computing device 1302 (and/or remote computing device 1350) and are executed by processor(s) 1304 of computer 1302 (and/or those of remote computing device 1350).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A method comprising:
   painting an irregular feature onto a target surface using a graphcuts operation that is constrained by at least one user input, wherein the at least one user input comprises a first user input and a second user input; and further comprising:
   accepting a demarcated foreground feature of a sample texture as the first user input; and
   accepting a delineated foreground region of the target surface as the second user input;
   constructing a dense mesh from a target mesh such that vertices of the dense mesh correspond to pixels of an image, wherein the vertices of the dense mesh have a substantially one-to-one correspondence with the pixels of the image;
   creating a work image from a work patch using at least one image chart;
   building the work patch around a constrained vertex of the dense mesh based on a working patch size, the constrained vertex having a largest number of immediate vertex neighbors that are already synthesized;
   synthesizing the sample texture onto a target surface associated with the target mesh responsive to the dense mesh;
   performing patch matching with regard to the work image using the sample texture;
   performing patch fitting with regard to the work patch using the sample texture and a graphcuts operation; and
   assigning texture values to vertices of a target mesh responsive to the patch matching and the patch fitting.

2. The method as recited in claim 1, wherein the performing comprises:
   patch matching with regard to the work image by translating and rotating the sample texture.

3. The method as recited in claim 1, wherein the sample texture comprises a bidirectional texture function (BTF) sample patch.

4. The method as recited in claim 1, wherein the constructing comprises:
   densely sampling the target mesh using one or more multi-chart geometric image meshes (MCGIMs) in conjunction with at least one texture atlas derived from the target surface.

5. A method comprising:
   painting an irregular feature onto a target surface using a graphcuts operation that is constrained by at least one user input, wherein the at least one user input comprises a first user input and a second user input; and further comprising:
   accepting a demarcated foreground feature of a sample texture as the first user input; and
   accepting a delineated foreground region of the target surface as the second user input;
   performing patch matching by translating and rotating the sample texture to locate a position for the sample texture;
   performing patch fitting by implementing a graphcuts operation with the sample texture at the located position;
   assigning texture values to vertices of a target mesh responsive to the patch matching and the patch fitting;
   densely resampling the target mesh to produce a dense mesh with vertices having a substantially one-to-one correspondence with pixels of at least one image;
   creating a work image from a work patch using at least one image chart; and
   building the work patch around a constrained vertex of the dense mesh based on a working patch size, the constrained vertex having a largest number of immediate vertex neighbors that are already synthesized.

6. The method as recited in claim 5, wherein the patch matching is performed in an image space, and the patch fitting is performed in a mesh space.

7. The method as recited in claim 5, wherein the performing patch matching comprises:
   performing the matching using at least one of a number of pre-computed rotated versions of the sample texture.

8. The method as recited in claim 5, further comprising:
   painting an irregular feature onto the target mesh using a graphcuts operation that involves minimizing energy corresponding to at least one user-input constraint.

9. A method comprising:
   accepting a first user input demarcating a foreground feature of a texture sample;
   accepting a second user input delineating a foreground region of an intermediate output texture;
   performing a graphcuts operation that involves the texture sample and that is constrained by the demarcated foreground feature and the delineated foreground region;
   synthesizing the demarcated foreground feature onto a target mesh to produce an updated output texture;
   performing patch matching by translating and rotating the sample texture to locate a position for the sample texture;

performing patch fitting by implementing a graphcuts operation with the sample texture at the located position;

assigning texture values to vertices of a target mesh responsive to the patch matching and the patch fitting;

densely resampling the target mesh to produce a dense mesh with vertices having a substantially one-to-one correspondence with pixels of an image of a target surface associated with the target mesh;

creating a work image from a work patch using at least one image chart; and building the work patch around a constrained vertex of the dense mesh based on a working patch size, the constrained vertex having a largest number of immediate vertex neighbors that are already synthesized.

10. The method as recited in claim 9, wherein the performing comprises:

minimizing a constraint energy, the constraint energy measuring how well a resulting synthesized texture satisfies the foreground constraints.

11. The method as recited in claim 10, wherein the performing further comprises:

minimizing a smoothness energy, the smoothness energy measuring how well a foreground feature patch fits into the intermediate output texture along a seam therebetween.

12. The method as recited in claim 10, wherein the minimizing comprises implementing an optimal swap move algorithm on pixels that are overlapped by a foreground feature patch and the intermediate output texture.

13. The method as recited in claim 9, further comprising:

synthesizing another sample texture onto the target surface to produce the intermediate output texture.

* * * * *